US009712863B1

(12) United States Patent
Madhavarao et al.

(10) Patent No.: US 9,712,863 B1
(45) Date of Patent: Jul. 18, 2017

(54) REMOTE CONTROL DEVICE WITH PROGRAMMING GUIDE INFORMATION

(71) Applicant: Le Technology, Inc., San Jose, CA (US)

(72) Inventors: Sanjay Kumar Madhavarao, San Diego, CA (US); Michael David Foster, San Diego, CA (US)

(73) Assignee: Le Technology, Inc., San Jose, CA (US)

( * ) Notice: Subject to any disclaimer, the term of this patent is extended or adjusted under 35 U.S.C. 154(b) by 0 days.

(21) Appl. No.: 15/232,671

(22) Filed: Aug. 9, 2016

(51) Int. Cl.
H04N 5/44 (2011.01)
H04N 5/445 (2011.01)
H04N 7/16 (2011.01)
H04N 21/431 (2011.01)
H04N 21/61 (2011.01)
G06F 3/041 (2006.01)
H04N 21/422 (2011.01)
H04N 21/84 (2011.01)

(52) U.S. Cl.
CPC ......... *H04N 21/4316* (2013.01); *G06F 3/041* (2013.01); *H04N 21/42204* (2013.01); *H04N 21/6125* (2013.01); *H04N 21/84* (2013.01)

(58) Field of Classification Search
CPC ......... H04N 21/4126; H04N 21/42204; H04N 21/42208; H04N 21/42209
USPC ...................... 725/39, 54, 141, 153; 348/734
See application file for complete search history.

(56) References Cited

U.S. PATENT DOCUMENTS

| 6,130,726 A * | 10/2000 | Darbee .................. G06F 3/147 348/734 |
| 8,195,141 B2 | 6/2012 | Louch et al. |
| 8,271,908 B2 | 9/2012 | Li et al. |
| 8,839,303 B2 | 9/2014 | Maddison et al. |
| 9,316,535 B2 | 4/2016 | Hotelling et al. |
| 9,338,493 B2 | 5/2016 | Van Os et al. |
| 9,368,024 B2 | 6/2016 | Tan et al. |
| 2003/0035074 A1 | 2/2003 | Dubil et al. |
| 2005/0108751 A1 | 5/2005 | Dacosta |
| 2012/0068857 A1 | 3/2012 | Rothkopf et al. |
| 2013/0035086 A1 | 2/2013 | Chardon et al. |
| 2013/0047174 A1 | 2/2013 | Lee et al. |
| 2016/0203710 A1 | 7/2016 | Bataillou et al. |

* cited by examiner

*Primary Examiner* — Dominic D Saltarelli
(74) *Attorney, Agent, or Firm* — Shumaker & Sieffert, P.A.

(57) ABSTRACT

A remote control device comprising: a display, at least one processor, and a storage device. The storage device stores instructions that when executed cause the at least one processor to: receive, from a television, a first subset of programming guide information, output, for display, a first user interface including at least some of the first subset of the programming guide information, receive, after outputting the first user interface, an indication of input, determine, based on the indication of input, a second subset of the programming guide information, receive, from the television, the second subset of the programming guide information, and output, for display, a second user interface including at least some of the second subset of the programming guide information.

17 Claims, 16 Drawing Sheets

|  TIME / CHANNEL | 7:00PM | 7:30PM | 8:00PM | 8:30PM |
|---|---|---|---|---|
| 6 | Sports News | Tennis | | |
| 7 | Animal Adventures | | Dog Show | |
| 8 | Football | | | Postgame |
| 9 | Business News | Talk Show | Nightly News | |
| 10 | Home Improvement Tips | | Infomercial | Real Estate |

FIG. 2A

| CHANNEL \ TIME | 7:00PM | 7:30PM | 8:00PM | 8:30PM |
|---|---|---|---|---|
| 17 | News | Olympics | | |
| 18 | Documentary | | Documentary | |
| 19 | Football: USC vs. UCLA | | | Postgame |
| 20 | Talk Show | News | Nightly News | |
| 21 | Movie | | Infomercial | Infomercial |

REMOTE CONTROL DEVICE WITH PROGRAMMING GUIDE INFORMATION

BACKGROUND

Modern techniques for distributing video content have changed how content is discovered, browsed, evaluated, and consumed. In addition to traditional cable, satellite, and over-the-air services, other sources are now popular, including subscription video, streaming sources, over-the-top content, and other sources. As sources for video content have multiplied, programming guide information has become more important than ever.

SUMMARY

This disclosure is directed to techniques relating to the display of programming guide information. In some examples, while a television is presenting content, a remote control device (e.g., a mobile device, tablet, smartphone, television remote control, or other device) may present programming guide information on a display screen integrated into the remote device. The remote control device may enable a user to browse and interact with the presented programming guide information, and the remote control device may do so without disrupting or interrupting the content being presented by the television. In some examples, the remote control device may retrieve programming guide information from the television, and may do so in a manner that enables programming guide information to be readily available to be presented in an efficient and effective way at the remote control device.

For instance, in some examples, the remote control device may present a user interface that includes programming guide information for a subset of available channels and for a subset of available times. While presenting this user interface, the remote control device may also retrieve and store programming guide information for additional channels or additional times, beyond those needed to create and display the user interface. Such additional programming guide information might not be displayed immediately, but it may be stored and available for potential use in creating future user interfaces. The additional programming guide information stored by the remote control device may include information that is related to one or more programs that are included in the user interface. Such information may be related by channel, time, subject matter, or such information may be related in other ways. The remote control device may determine, based on input detected by the remote control device, the additional programming guide information. In some examples, the television may determine, based on input detected by the remote control device, the additional programming guide information.

By storing the additional programming guide information locally at the remote control device, it may be accessed relatively quickly. Accordingly, when the remote control device creates and presents updated user interfaces in response to detecting interactions with the graphical user interface (e.g., swiping, scrolling, and/or selection gestures), the remote control device is responsive and efficient, and provides a pleasant user experience.

In one example, a method comprises receiving, by a remote control device from a television, a first subset of programming guide information, outputting, by the remote control device for display, a first user interface including at least some of the first subset of the programming guide information, receiving, by the remote control device after outputting the first user interface, an indication of input, determining, based on the indication of input, a second subset of the programming guide information, receiving, by the remote control device from the television, the second subset of the programming guide information, and outputting, by the remote control device for display, a second user interface including at least some of the second subset of the programming guide information.

In another example, a remote control device comprises a display, at least one processor, and a storage device that stores instructions that when executed cause the at least one processor to: receive, from a television, a first subset of programming guide information, output, for display, a first user interface including at least some of the first subset of the programming guide information, receive, after outputting the first user interface, an indication of input, determine, based on the indication of input, a second subset of the programming guide information, receive, from the television, the second subset of the programming guide information, and output, for display, a second user interface including at least some of the second subset of the programming guide information.

In another example, a system comprises a television comprising a storage device on which programming guide information is stored, and a remote control device capable of communicating with the television, wherein the remote control device includes at least one processor programmed to: receive, from the television, a first subset of the programming guide information, output, for display, a first user interface including at least some of the first subset of the programming guide information, receive, after outputting the first user interface, an indication of input, determine, based on the indication of input, a second subset of the programming guide information, receive, from the television, the second subset of the programming guide information, and output, for display, a second user interface including at least some of the second subset of the programming guide information.

In another example, a television comprises a display, at least one processor, and one or more storage devices on which programming guide information and instructions are stored, wherein the instructions, when executed, cause the at least one processor to: send, to a remote control device, a first subset of the programming guide information, receive, from the remote control device, an indication of input, determine, based on the indication of input, a second subset of the programming guide information, and send, to the remote control device, for display, the second subset of the programming guide information.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIG. 2A is a conceptual diagram illustrating an example programming guide user interface for an example remote control device.

Like reference characters denote like elements throughout the figures and text.

DETAILED DESCRIPTION

Figure 1:
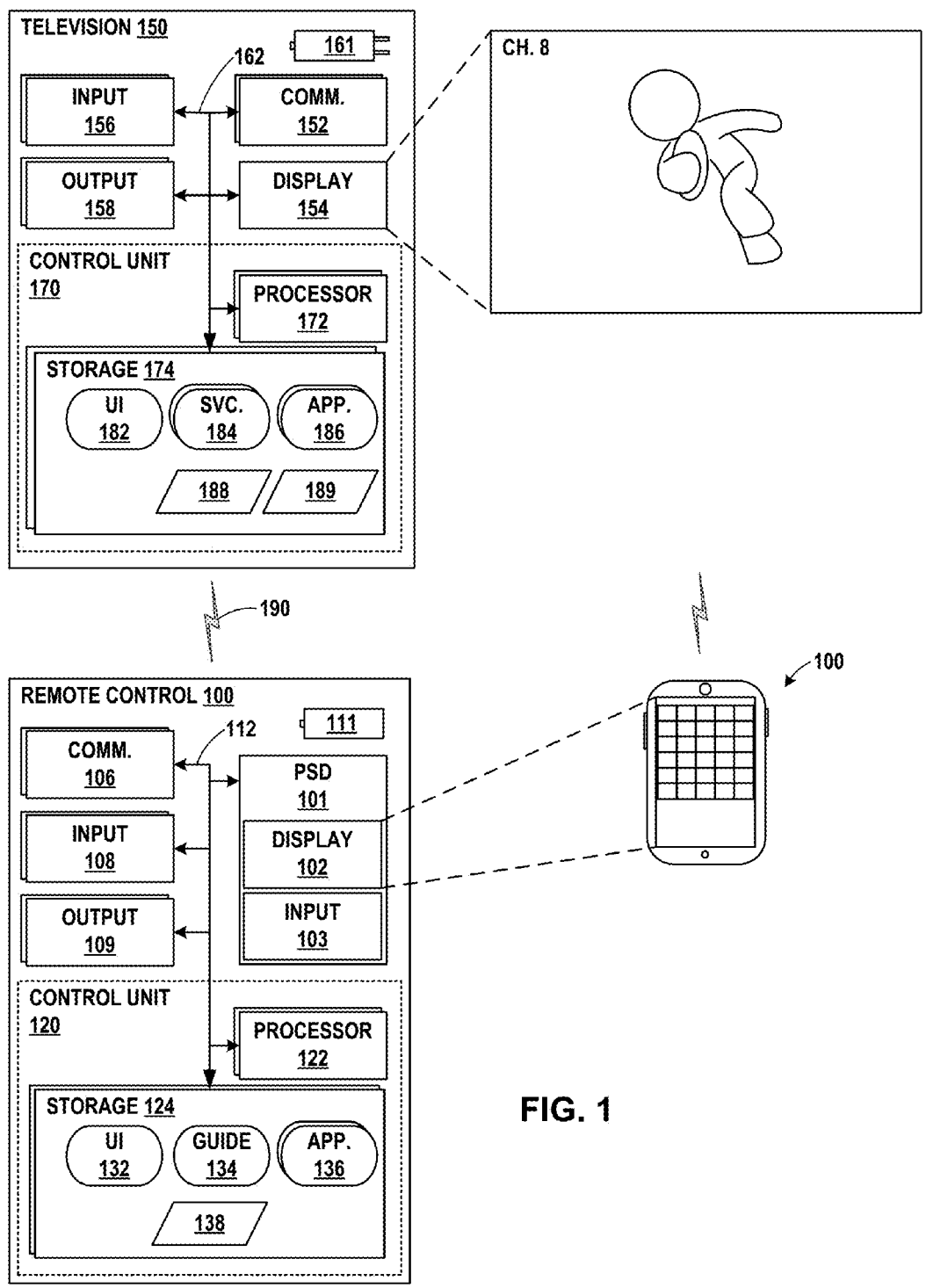
FIG. 1 is a block diagram illustrating an example system including an example remote control device and an example television in accordance with one or more aspects of the present disclosure.

FIG. 1 is a block diagram illustrating an example system including an example remote control device 100 and an example television 150 in accordance with one or more aspects of the present disclosure. Remote control device 100 may be a mobile device, such as a smart phone, a tablet computer, a laptop computer, a computerized watch, a television remote control, or any other type of wearable or non-wearable, mobile, or non-mobile computing device that may be capable of operating in the manner described herein.

Remote control device 100 may be used to control one or more aspects of television 150. Remote control device 100 may include presence-sensitive display (PSD) 101, communication unit 106, input device 108, output device 109, power source 111, communication channel 112, and control unit 120.

Television 150 may operate to inform, entertain, or otherwise present content to a viewer. Television 150 may include communication unit 152, television display 154, input device 156, output device 158, power source 161, communication channel 162, and control unit 170. Remote control device 100 and television 150 may communicate via communications signal 190.

Referring to remote control device 100, presence-sensitive display 101 may, in some examples, function as both an input and an output device, and presence-sensitive display 101 may further include both display component 102 and input component 103, as described below. Presence-sensitive display 101 may be implemented using various technologies. For instance, presence-sensitive display 101 may be implemented as one or more presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. Presence-sensitive display 101 may output information to a user in the form of a user interface, which may be associated with functionality provided by remote control device 100. Such user interfaces may be associated with a television application or a remote control application, but such interfaces may also be associated with computing platforms, operating systems, applications, and/or services executing at or accessible from remote control device 100 (e.g., banking applications, electronic message applications, chat applications, Internet browser applications, mobile or desktop operating systems, social media applications, electronic games, and other types of applications). For example, presence-sensitive display 101 may present one or more user interfaces which may be graphical user interfaces of an application executing at remote control device 100 and includes various graphical elements displayed at various locations of presence-sensitive display 101. Further, while primarily described with respect to a presence-sensitive display 101, the techniques are similarly applicable to a display that is not capable of sensing inputs.

While illustrated as an internal component of remote control device 100, presence-sensitive display 101 may also represent an external component that shares a data path with remote control device 100 for transmitting and/or receiving input and output. For instance, in one example, presence-sensitive display 101 represents a built-in component of remote control device 100 located within and physically connected to the external packaging of remote control device 100 (e.g., a screen on a mobile phone). In another example, presence-sensitive display 101 represents an external component of remote control device 100 located outside and physically separated from the packaging or housing of remote control device 100 (e.g., a monitor, a projector, etc. that shares a wired and/or wireless data path with remote control device 100).

Display component 102 may function as one or more output (e.g., display) devices using technologies including liquid crystal displays (LCD), dot matrix displays, light emitting diode (LED) displays, organic light-emitting diode (OLED) displays, e-ink, or similar monochrome or color displays capable of generating tactile, audio, and/or visual output.

Input component 103 may detect input (e.g., touch and non-touch input) from a user of remote control device 100, which may include detecting one or more gestures (e.g., the user touching, pointing, and/or swiping at or near one or more locations of presence-sensitive display 101 with a finger or a stylus pen). In some examples, input component 103 may detect an object at and/or near display component 102. As one example range, input component 103 may detect an object, such as a finger or stylus that is within two inches or less of display component 102. Input component 103 may determine a location (e.g., an {x, y} coordinate) of display component 102 at which the object was detected. In another example range, input component 103 may detect an object six inches or less from display component 102 and other ranges are also possible. Input component 103 may determine the location of display component 102 selected by a user's finger using capacitive, inductive, and/or optical recognition techniques. In some examples, input component 103 also provides output to a user using tactile, audio, or video stimuli as described with respect to display component 102. In some cases, remote control 100 may include a display that is not presence-sensitive and having display component 102, and in such cases, the display may not include an input component 103.

One or more communication units 106 of remote control device 100 may communicate with external devices by transmitting and/or receiving data. For example, remote control device 100 may use communication units 106 to transmit and/or emit infrared light or RF signals. Remote control device 100 may use communication units 106 to detect infrared light or RF signals. In other examples, communication unit 106 may receive radio signals on a radio network such as a cellular radio network. In some examples, communication units 106 may transmit and/or receive satellite signals on a satellite network such as a Global Positioning System (GPS) network. Examples of communication units 106 include a network interface card (e.g. such as an Ethernet card), an optical transceiver, a radio frequency transceiver, a GPS receiver, or any other type of device that can send and/or receive information. Other examples of communication units 106 may include Bluetooth®, GPS, 3G, 4G, and Wi-Fi® radios found in mobile devices as well as Universal Serial Bus (USB) controllers and the like.

One or more input devices 108 may receive input, such as from a keyboard, voice responsive system, video camera, buttons, pointing device, control pad, microphone or any other type of device for detecting input from a human or machine. Input devices 108 may also include one or more sensors, which may include may include an accelerometer that generates accelerometer data. Accelerometer data may indicate an acceleration and/or a change in acceleration of remote control device 100. Input devices 108 may include a gyrometer that generates gyrometer data. Gyrometer data may indicate a physical orientation and/or change in physical orientation of remote control device 100. In some examples, the orientation may be relative to one or more reference points. Input devices 108 may include a magnetometer that generates magnetometer data. Magnetometer data may indicate the magnetization of an object that is touching or in proximity to remote control device 100. Magnetometer data may indicate the Earth's magnetic field, and in some examples, provide directional functionality of a compass. Input devices 108 may include an ambient light sensor that generates ambient light data. The ambient light data may indicate an intensity of light to which remote control device 100 is exposed. Input devices 108 may include a proximity sensor that generates proximity data. Proximity data may indicate whether an object is within proximity to remote control device 100. In some examples, proximity data may indicate how close an object is to remote control device 100. In some examples, input devices 108 may include a clock that generates a date and time. The date and time may be a current date and time. Input devices 108 may include temperature sensor that measures ambient temperature in proximity to remote control device 100. The ambient temperature may indicate an intensity of temperature.

One or more output devices 109 may generate, receive, or process output. Examples of output are tactile, audio, and video output. Output devices 109 of remote control device 100, in one example, may include a presence-sensitive screen, sound card, video graphics adapter card, speaker, cathode ray tube (CRT) monitor, liquid crystal display (LCD), or any other type of device for generating output to a human or machine. Output devices 109 may include display devices such as cathode ray tube (CRT) monitor, liquid crystal display (LCD), Light-Emitting Diode (LED) or any other type of device for generating tactile, audio, and/or visual output.

Power source 111 may provide power to one or more components of remote control device 100. In some examples, power source 111 may be a battery. Examples may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 111 may have a limited capacity (e.g., 1000-3000 mAh). In other examples, remote control device 100 and/or power source 111 may receive power from the primary alternative current (AC) power supply in a building, home, or other location. In other examples, remote control device 100 and/or power source 111 may receive power from another source.

Control unit 120 may provide an operating environment or platform for one or one more modules, such as a combination of hardware, firmware, and software. For instance, control unit 120 may include one or more processors and storage devices that may execute instructions and store data of one or more modules. Control unit 120 may store and execute the data and instructions of one or more applications, modules, or software. Control unit 120 may also be operably coupled to one or more other software and/or hardware components, including, but not limited to, one or more of the components illustrated in FIG. 1. Although control unit 120 is illustrated as including one or more processors 122 and one or more storage devices 124, control unit 120 may include more or fewer components than shown. For instance, control unit 120 may include one or more output devices, input devices, input/output ports or interface, sensors and/or communication units to name only a few examples. In some examples, control unit 120 may only include one processor.

One or more storage devices 124 within remote control device 100 may store information for processing during operation of remote control device 100. In some examples, one or more storage devices 124 are temporary memories, meaning that a primary purpose of the one or more storage devices is not long-term storage. Storage devices 124 on remote control device 100 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 124, in some examples, also include one or more computer-readable storage media. Storage devices 124 may be configured to store larger amounts of information than volatile memory. Storage devices 124 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 124 may store program instructions and/or data associated with one or more of the modules described in accordance with one or more aspects of this disclosure.

Remote user interface module 132 may manage user interactions with presence-sensitive display 101 and other components of remote control device 100. In some examples, remote user interface module 132 may act as an intermediary between various components of remote control device 100 to make determinations based on user input detected by presence-sensitive display 101 and/or one or more input devices 108 and generate output at presence-sensitive display 101 in response to the user input. Remote user interface module 132 may receive instructions from an application, service, platform, or other module of remote control device 100 to cause presence-sensitive display 101 to output a user interface. Remote user interface module 132 may often be a sub-component of an operating system controlling operation of remote control device 100, but remote user interface module 132 may alternatively or also be a stand-alone application, service, or module executing at remote control device 100. Remote user interface module 132 may manage inputs received by remote control device 100 as a user views and interacts with the user interface presented at presence-sensitive display 101 and update the user interface in response to receiving additional instructions from the application, service, platform, or other module of remote control device 100 that is processing the user input.

Remote programming guide module 134 may perform operations in accordance with one or more aspects of the present disclosure. In some examples, remote programming guide module 134 may be a stand-alone application, service, or module executing at remote control device 100 and in other examples, remote programming guide module 134 may be a sub-component of an operating system controlling operation of remote control device 100. For example, remote programming guide module 134 may be integrated into a remote control application or third-party remote control, television, or video application executing at remote control device 100. In other examples, remote programming guide module 134 may be a stand-alone application or subroutine that is invoked by an application or operating platform of remote programming guide module 134 at appropriate times. In some examples, remote control device 100 may download and install remote programming guide module 134 from an application repository of a service provider (e.g., via the Internet). In other examples, remote programming guide module 134 may be preloaded as part of the operating system of remote control device 100.

Programming guide information 138 may include information stored by remote programming guide module 134 or other module. In some examples, programming guide information 138 may originate from television 150 or from another source.

One or more remote application modules 136 may represent some or all of the other various individual applications and services executing at and accessible from remote control device 100. A user of remote control device 100 may interact with a graphical user interface associated with one or more remote application modules 136 to cause remote control device 100 to perform a function. Numerous examples of remote application modules 136 may exist and may include a remote control application, a television application, a video streaming application, a fitness application, a calendar application, a personal assistant or prediction engine, a search application, a map or navigation application, a transportation service application (e.g., a bus or train tracking application), a social media application, a game application, an e-mail application, a chat or messaging application, an Internet browser application, or any and all other applications that may execute at remote control device 100.

In some examples, remote control device 100 may be implemented by an application executing on a mobile device or mobile smartphone. In other examples, remote control device 100 may be implemented as a standalone device. Such a device may be dedicated to the task of controlling television 150 and/or related components. In some examples, remote control device 100 may have physical buttons or other physical features to enter channel numbers, Internet addresses, and/or to perform control functions (e.g., to change a channel, adjust volume, adjust a setting, etc.).

With reference to television 150, television display 154 may be an output device such as cathode ray tube (CRT) monitor, liquid crystal display (LCD), Light-Emitting Diode (LED) or any other type of device for generating tactile, audio, and/or visual output. In some examples, television display 154 may serve as the visual component of a widescreen and/or high definition television. In some examples, television display 154 may also function as both an input and an output device, and may be implemented using various presence-sensitive display panels, as described in connection with presence-sensitive display 101.

One or more communication units 152 of television 150 may communicate with devices external to television 150 by transmitting and/or receiving data. In a manner similar to that described in connection with communication unit 106 of remote control device 100, television 150 may use communication units 152 to transmit and/or emit infrared light or RF signals; television 150 may use communication units 152 to detect infrared light or RF signals. In other examples, communication unit 152 may receive radio signals on a radio network such as a cellular radio network. In some examples, communication units 152 may transmit and/or receive satellite signals on a satellite network such as a Global Positioning System (GPS) network. Examples of communication units 152 include a network interface card (e.g. such as an Ethernet card), an optical transceiver, a radio frequency transceiver, a GPS receiver, or any other type of device that can send and/or receive information. Other examples of communication units 152 may include Bluetooth®, GPS, 3G, 4G, and Wi-Fi® radios found in mobile devices as well as Universal Serial Bus (USB) controllers and the like.

One or more input devices 156 may receive input, such as from a remote control, mobile device, keyboard, voice responsive system, video camera, buttons, pointing device, control pad, microphone or any other type of device for detecting input from a human or machine. Input devices 156 may also include one or more other input devices as described in connection with remote control device 100. Input device 156 may also include one or more set-top boxes, cable television interfaces, satellite television interfaces, interfaces to streaming or online sources. Input device 156 may also include one or more devices including or implementing modules, functionality, SDKs, APIs, or other services of Google TV, Android TV, Android TV mobile services, Google Mobile Services, Apple TV, Xfinity, Tivo, Rovi, Roku, DirectTV, or Dish Network TV, or any other provider.

One or more output devices 158 may further generate, receive, or process output. Examples of output devices 158 may include any of the output devices described in connection with remote control device 100, and may also include one or more USB interfaces, video and/or audio output interfaces, or other interfaces or devices.

Power source 161 may provide power to one or more components of television 150. Power source 161 may receive power from the primary alternative current (AC) power supply in a building, home, or other location. In other examples, power source 161 may also be a battery, such as those described in connection with remote control device 100. In still further examples, television 150 and/or power source 161 may receive power from another source.

Control unit 170 may provide an operating environment or platform for one or one more modules, such as a combination of hardware, firmware, and software. For instance, control unit 170 may include one or more processors and storage devices that may execute instructions and store data of one or more modules. Control unit 170 may store and execute the data and instructions of one or more applications, modules, or software. Control unit 170 may also be operably coupled to one or more other software and/or hardware components, including, but not limited to, one or more of the components illustrated in FIG. 1. Although control unit 170 is illustrated as including one or more processors 172 and one or more storage devices 174, control unit 170 may include more or fewer components than shown. For instance, control unit 170 may include one or more output devices, input devices, input/output ports or interface, sensors and/or communication units to name only a few examples. In some examples, control unit 170 may only include one processor.

One or more storage devices 174 within television 150 may store information for processing during operation of television 150. In some examples, one or more storage devices 174 are temporary memories, meaning that a primary purpose of the one or more storage devices is not long-term storage. Storage devices 174 on television 150 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 174, in some examples, also include one or more computer-readable storage media. Storage devices 174 may be configured to store larger amounts of information than volatile memory. Storage devices 174 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 174 may store program instructions and/or data associated with one or more of the modules described in accordance with one or more aspects of this disclosure.

UI module 182 may manage user interactions with television display 154 and other components of television 150. In some examples, UI module 182 may act as an intermediary between various components of television 150 to make determinations based on user input detected by television 150 and generate output at television display 154 in response to the user input. UI module 182 may receive instructions from an application, service, platform, or other module of television 150 to cause television display 154 to output a user interface or other content. UI module 182 may often be a sub-component of an operating system controlling operation of television 150, but UI module 182 may alternatively or also be a stand-alone application, service, or module executing at television 150. UI module 182 may manage inputs received by television 150 as a user views and interacts with the user interface or other content presented at television display 154 and may update the user interface or other content in response to receiving additional instructions from the application, service, platform, or other module of television 150 that is processing the user input.

Service module 184 may perform operations in accordance with one or more aspects of the present disclosure. In some examples, service module 184 may be a stand-alone application, service, or module executing at television 150 and in other examples, service module 184 may be a sub-component of an operating system controlling operation of television 150. For example, service module 184 may be integrated into a television application, operating system, or operating environment executing at television 150. In other examples, service module 184 may be a stand-alone application or subroutine that is invoked by an application or operating platform of service module 184 at appropriate times. In some examples, television 150 may download and install service module 184 from an application repository of a service provider (e.g., via the Internet). In other examples, service module 184 may be preloaded as part of the television 150 or as part of the operating system of television 150. In some examples, service module 184 may include services, utilities, or other functionality provided by Android TV, Apple TV, or other commercially-available, open source, or proprietary operating environments, APIs, software development environments, or other environments. Service module 184 may be implemented as a JavaScript interface or JavaScript Object Notation (JSON) interface. In some examples, service module 184 may be implemented as a web server with a JSON interface.

One or more application modules 186 may represent some or all of the other various individual applications and services executing at and accessible from television 150. A user of television 150 may interact with a graphical user interface associated with one or more application modules 186 to cause television 150 to perform a function. Numerous examples of application modules 186 may exist and may include a remote control application, a television application, a video streaming application, a fitness application, a calendar application, a personal assistant or prediction engine, a search application, a map or navigation application, a transportation service application (e.g., a bus or train tracking application), a social media application, a game application, an e-mail application, a chat or messaging application, an Internet browser application, or any and all other applications that may execute at television 150.

Programming guide information 188 may include information stored by service module 184 or other module. Programming guide information 188 may include information received from a service provider or cable, satellite, video, streaming, or other service provider. Recorded program information 189 may include one or more recorded videos, which may be recorded by television 150 in response to input detected by television 150. In some cases, programming guide information 188 may be sent to television 150 from a programming guide information service, e.g., via the Internet or a television service connection such as a cable-based or satellite-based connection.

When power is initially supplied to television 150, remote control device 100 and/or television 150 may perform an initialization procedure. In some examples, remote programming guide module 134 and/or service module 184 may, in response to power being supplied to television 150 (and/or to remote control device 100), perform various initialization procedures. For instance, service module 184 and may attempt to discover one or more devices for communication. Such devices may include one or more remote control devices 100.

Service module 184 of television 150 may cause communication unit 152 to send a signal (e.g., communications signal 190). One or more remote control devices 100 may detect the signal. For example, communication unit 106 of remote control device 100 may detect the signal, and output to remote programming guide module 134 an indication of the received signal. Remote programming guide module 134 may determine, based on the indication of the received signal, that another device, such as television 150, is attempting to communicate, establish communications, or pair for purposes of communication. Remote programming guide module 134 may cause communication unit 106 to send a responsive signal. Communication unit 152 of television 150 may detect the responsive signal, and output to service module 184 an indication of the responsive signal. Service module 184 may determine, based on the indication of the responsive signal and/or additional communications with remote control device 100, that communication with remote control device 100 has been established. Remote programming guide module 134 may also determine, based on indications of one or more signals received from communication unit 106, that communication with television 150 has been established. In some examples, remote control device 100 and television 150 may thereafter be paired for subsequent communication, which may enable remote control device 100 and television 150 to communicate without performing some or all of the discovery procedure just outlined.

Remote control device 100 and television 150 may perform an authentication protocol or procedure to ensure that remote control device 100 and television 150 are authorized, capable, licensed, or otherwise configured to operate together properly. Remote programming guide module 134 of remote control device 100 may cause communication unit 106 to send a signal as an authentication challenge to television 150. Communication unit 152 of television 150 may detect the signal, and output an indication of the signal to service module 184. Service module 184 may, in response to receiving the indication of the signal, cause communication unit 152 to send a responsive signal. Communication unit 106 may detect the responsive signal and output to remote programming guide module 134 an indication of the responsive signal. Remote programming guide module 134 may determine, based on the indication of the responsive signal and/or other communications, that television 150 is an authorized, capable, and/or licensed television.

Alternatively, or in addition, television 150 may send a signal that acts as an authentication challenge to remote control device 100, and based on any response received, television 150 may determine whether remote control device 100 is an authorized, capable, or licensed remote control device 100. In other examples, other authentication, encryption, and/or verification procedures could be followed to determine that remote control device 100 or television 150 or both are authorized, capable, or licensed. Performing such authentication, encryption, and/or verification procedures may ensure that television 150 is not controlled by an unauthorized remote control device (e.g., a neighbor's remote control), may ensure any access rights to data stored in television 150 or storage device 174 are not misappropriated by an unauthorized device (e.g., downloading proprietary programming guide information 188), and/or may ensure that remote programming guide module 134 of remote control device 100 is not used to control another manufacturer's television (e.g., a television not intended for use with one or more remote control devices 100 executing remote programming guide module 134). In general, any communication between remote control device 100 and television 150 may be performed through secure or encrypted communications, and any description of communications described herein can, in some examples, be performed through secure channels.

In some examples, some or all the initialization, authentication, or other operations described above as being performed by remote programming guide module 134 could alternatively be performed by one or more remote application modules 136. Further, in some examples, some or all of the initialization or other operations described above as being performed by service module 184 could alternatively be performed by one or more application modules 186.

Television 150 may initially tune to a default channel and television 150 may send a signal including information identifying that channel. The default channel may be a factory setting, and/or the default channel may be configurable through a setting in storage device 174. In other examples, the default channel may be set by a service provider (e.g., cable or satellite provider). In other examples, the default channel may be or may be configured to be the channel television 150 was tuned to when television 150 was last powered off.

Service module 184 of television 150 may cause communication unit 152 to send a signal identifying the channel to which television 150 is initially tuned. Communication unit 106 of remote control device 100 may detect the signal, and may output to remote programming guide module 134 an indication of the detected signal. Remote programming guide module 134 may determine, based on the indication of the detected signal, that television 150 is tuned to channel 8. In the example shown in FIG. 1, channel 8 is broadcasting a football game.

Remote programming guide module 134 may create a user interface and cause remote user interface module 132 to present the user interface at presence-sensitive display 101. In some examples, remote programming guide module 134 creates a user interface that includes programming guide information for presentation at presence-sensitive display 101. To generate such an interface, remote programming guide module 134 may cause communication unit 106 to send a signal requesting programming guide information for one or more channels, including channel 8, the channel to which television 150 has initially been tuned.

Communication unit 152 may detect the signal, and may output to service module 184 an indication of the detected signal. Service module 184 may in some cases decrypt the information included in the indication of the detected signal, and may determine, based on the indication of the detected signal, that the signal corresponds to a request for programming guide information.

Responsive to the indication of the detected signal, service module 184 may cause communication unit 152 to send a signal including programming guide information. In some examples, service module 184 may encrypt the signal including the programming guide information so that only an authorized device (or the device that requested the information) can interpret and/or access the programming guide information. Communication unit 106 of remote control device 100 may detect the signal, and output to remote programming guide module 134 an indication of the detected signal. Remote programming guide module 134 may in some cases decrypt the information included in the indication of the detected signal and determine, based on the indication of the detected signal, that the signal corresponds to the requested programming guide information. Remote programming guide module 134 may parse the programming guide information from the indication of the detected signal and create a user interface including at least some of the programming guide information. Remote programming guide module 134 may cause remote user interface module 132 to present the user interface at presence-sensitive display 101.

In some examples, a user interface including programming guide information is presented at presence-sensitive display 101 without disrupting the content being presented at television display 154. In such an example, television 150 may continue to present content from channel 8 at television display 154. Further, in some examples, communication between remote control device 100 and television 150 may be encrypted, such as, for example, through a public key encryption scheme. Authentication and exchange of keys and establishment of trusted communication may be set up between remote control device 100 and television 150 during initialization or at another time. Communications may be encrypted and decrypted by remote programming guide module 134, service module 184, and/or other modules. In some examples, trusted communication may help ensure that only an authorized device may be able to interpret signals generated by remote control device 100 or television 150.

Remote programming guide module 134 may also request, retrieve, and store programming guide information for additional channels or additional times, beyond those needed to create and present the user interface presented at presence-sensitive display 101. Remote programming guide module 134 may store or cache such additional programming guide information in storage devices 124 for use in generating new user interfaces as needed. In some examples, such additional programming guide information is chosen to include programming guide information that is more likely than other programming guide information to be used in a future user interface. For example, when remote control device 100 is presenting programming guide information at presence-sensitive display 101 for a program scheduled for 7 pm on channel 8, programming information from nearby channels (e.g, channels 3 through 7 or channels 9 through 13), from nearby times (e.g., 8 pm), or from programs having similar subject matter (e.g., another football game) may be more likely than other programming guide information to be used in a future user interface presented by remote control device 100 at presence-sensitive display 101.

In some examples, service module 184 of television 150 may determine the additional programming guide information. For instance, service module 184 may process programming guide information 188 to identify additional programming guide information from nearby channels, from nearby times, or from programs having similar subject matter. Service module 184 may then cause communication unit 152 to send a signal including the additional programming guide information to remote control 100. The additional programming guide information may include association data associating nearby channels, associating channels as including similar subject matter, or associating programs including similar subject matter. Remote programming guide module 134 may process the association data to identify programming guide information for presentation by remote control device 100 at presence-sensitive display 101.

In each of the above cases, the identified programming guide information is related in some way to programming guide information presented by remote control device 100 at presence-sensitive display 101. In the first example, the additional programming guide information may be related by channel, meaning that the additional programming guide is adjacent to or near one or more the channels included in the user interface presented by remote control device 100. In the second example, such additional programming guide information may be related by time, meaning that the additional programming guide information is for a time that is adjacent to or near one or more of the program times included in the user interface presented by remote control device 100. And in the third example, such additional programming guide information may be related by subject matter or topic. In some cases, this means that the additional programming guide information may be similar to the subject matter of one or more of the programs included in the user interface presented by remote control device 100, or may include details about one or more of the programs included in the user interface presented by remote control device 100. In some examples, where a channel or program has been identified as a favorite, or is otherwise popular, it may be considered related by subject matter or topic, or in another way.

In some examples, related programming guide information, as described above, is often the programming guide information needed by remote control device 100 to construct future user interfaces. By storing such additional related programming information in storage device 124, remote control device 100 may be able to access such information more quickly later when generating additional user interfaces, and thereby provide a responsive and efficient user interface for presentation at presence-sensitive display 101.

Presenting programming guide information at presence-sensitive display 101 of remote control device 100 may be more effective, efficient, convenient, and appropriate than presenting programming guide information at television display 154. By presenting programming guide information at remote control device 100, a user of remote control device 100 may be able to more effectively multitask (e.g., both watch television 150 and browse programming guide content on remote control device 100). A user may also be more inclined to spend time actually browsing programming guide information carefully since doing so does not interrupt the content being presented at television display 154. And in situations where other people are also watching the content at television display 154, it might not be appropriate or courteous to disrupt the content being presented at television display 154 by causing programming guide information to be displayed at television display 154. Presenting programming guide information at remote control device 100 may avoid such problems.

Further, by intelligently and efficiently retrieving certain related programming guide information (e.g., from television 150) before it is needed, rather than as it is needed, remote control device 100 may be able to present an efficient and responsive user interface, without requiring remote control device 100 to store a significant amount of programming guide information. And at least as compared to attempting to store all or substantially all of the current programming guide information at remote control device 100, selectively retrieving related programming guide information may result in less data transferred between television 150 and remote control device 100. By transferring less data, remote control device 100 and/or television 150 or both may perform less operations, cause fewer communication signals to be generated, and as a result, consume less electrical power.

FIG. 2A is a conceptual diagram illustrating an example programming guide user interface 200*a* for an example remote control device 100. Programming guide user interface 200*a* of FIG. 2A is an example of a user interface that may be presented by remote control device 100 in FIG. 1. In the example of FIG. 2A, programming guide user interface 200*a* includes programming guide information for channels 6-10 and presents the current time slot, starting at 7:00 pm, along the left side of programming guide user interface 200*a*. Programming guide information for the current channel (i.e., channel 8) starting with the current time (e.g., approximately 7 pm or shortly thereafter) may be presented, along with programming guide information for the same times for channels adjacent to or near channel 8 (e.g., channels 6, 7, 9, and 10).

In the example of FIG. 2A, remote control device 100 causes programming guide user interface 200*a* to visually indicate or highlight currently selected program 208, which may correspond to the content currently being presented at television display 154 for television 150. Remote control device 100 may indicate or highlight currently selected program 208 in other ways. In some examples, programming guide user interface 200*a* may include much more programming information, but in other examples, due to size limitations of presence-sensitive display 101 and/or other limitations, only a small number of channels and only a short window of time might be presented by programming guide user interface 200*a*.

Figure 2B:
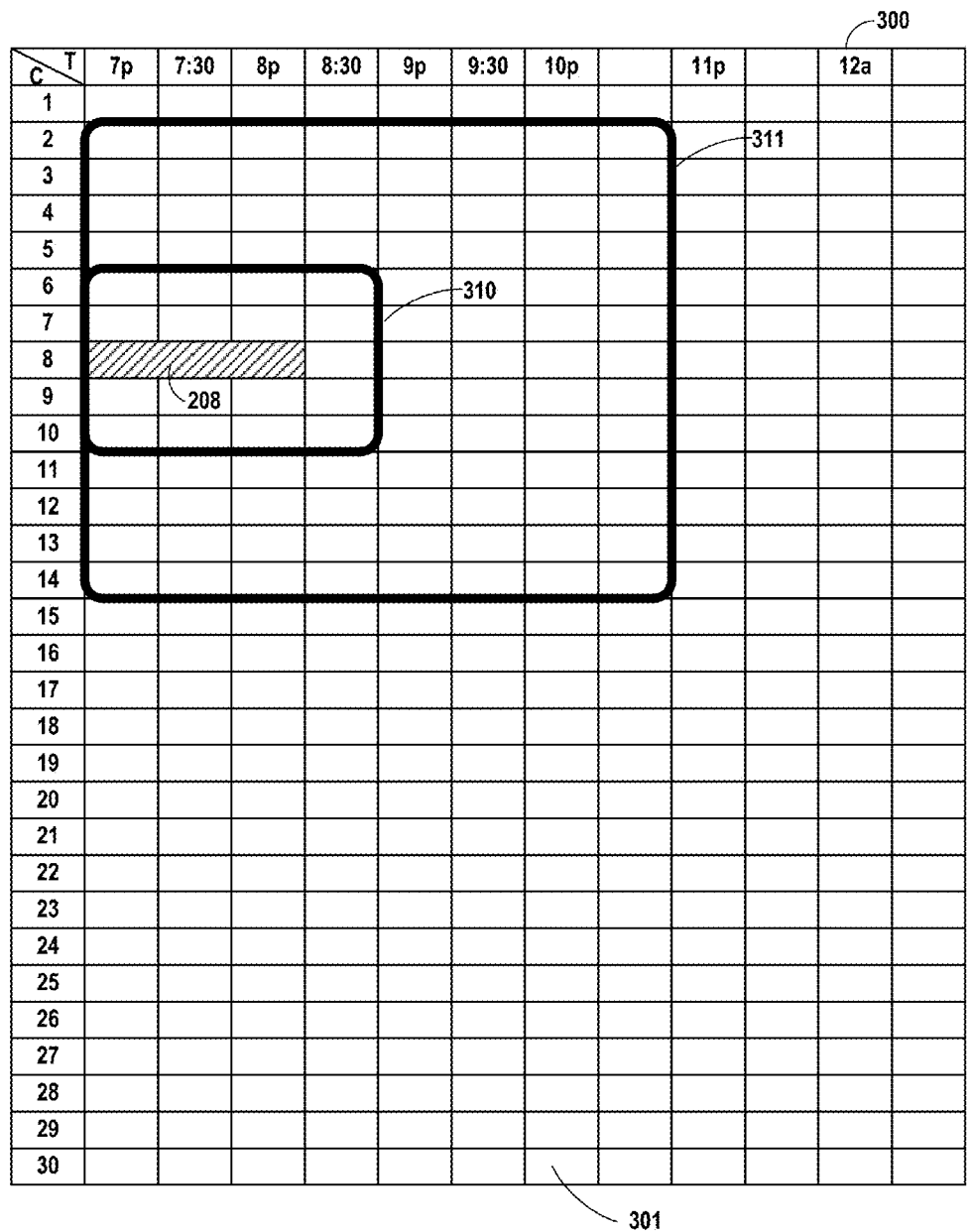
FIG. 2B is a conceptual diagram illustrating an example channel grid that represents channel guide information for some or all of the channels available to be shown on television.

FIG. 2B is a conceptual diagram illustrating an example channel grid 300 that represents channel guide information for some or all of the channels available to be shown on television 150. In some examples, FIG. 2B may represent all of the channels available to be shown by television 150 by a particular cable, satellite, streaming, or other content provider or source. In some examples, many more channels may be available in typical cable and satellite TV systems (e.g., hundreds or more), and in the case of streaming sources, many more than that (e.g., millions). For the purposes of illustration, only 30 channels, sources, or other content publishers are represented in the example channel grid 300 of FIG. 2B.

Further, in the example of FIG. 2B, programming information is shown for the times 7 pm through the 12:30 am time slot. In some examples, programming information may be available for a much longer period of time, often on the order of weeks or more. Further, in the example of FIG. 2B, programming information might be available only for present and future time slots, and when a time slot has passed, programming information for that expired time slot may no longer be available from television 150 or another source. In other examples, programming information for prior or historical or past time slots may be available from television 150 or another source.

FIG. 2A and FIG. 2B illustrate one or more examples and/or one or more example operations in accordance with one or more aspects of the present disclosure. For purposes of illustration, FIG. 2A and FIG. 2B are described below within the context of remote control device 100 and television 150 of FIG. 1.

With reference to FIG. 2A and FIG. 2B, remote control device 100 may retrieve programming data, and may present programming guide user interface 200*a* at presence-sensitive display 101. Remote programming guide module 134 of remote control device 100 may cause communication unit 106 to send a signal requesting programming guide information for channels 6 through 10, for time slots starting at 7 pm and extending through the 8:30 pm (i.e., channel grid region 310 of FIG. 2B). Communication unit 152 may detect the signal, and may output to service module 184 an indication of the detected signal. Service module 184 of television 150 may determine, based on the indication of the detected signal, that the signal corresponds to a request for programming guide information for channels 6 through 10 for the 7 pm through 8:30 pm time slots. Responsive to the indication of the detected signal, service module 184 may cause communication unit 152 to send a signal including the requested programming guide information. Communication unit 106 of remote control device 100 may detect the signal, and may output to remote programming guide module 134 an indication of the detected signal. Remote programming guide module 134 may determine, based on the indication of the detected signal, that the signal corresponds to the requested programming guide information. Remote programming guide module 134 may parse the programming guide information from the indication of the detected signal, create programming guide user interface 200*a*, and cause remote user interface module 132 to present programming guide user interface 200*a* at presence-sensitive display 101.

In some examples, when remote programming guide module 134 creates programming guide user interface 200*a* for display at presence-sensitive display 101, remote programming guide module 134 may request and/or store only the programming guide information required to create programming guide user interface 200*a*. For example, programming guide information 188 may include the channels and time slots represented by channel grid region 310 of FIG. 2B. In other examples, remote programming guide module 134 may request and/or store all or substantially all of the available programming guide information (e.g., all of the information in channel grid 300 of FIG. 2B) or all of the programming guide information made available by television 150. In such an example, remote programming guide module 134 may request and/or store all or substantially all of the programming guide information initially, or prior to, or during creation of one or more user interfaces for presentation at presence-sensitive display 101. Remote programming guide module 134 may store such programming guide information in storage device 124 as programming guide information 138. In some examples, depending on the size of the guide data for each channel or source, and also depending on the number of channels or sources, it might not be practical or efficient or desirable for remote control device 100 to receive and store all or substantially all of the available programming guide information.

In other examples, remote control device 100 might not retrieve all of the information in channel grid 300 of FIG. 2B, but remote control device 100 may retrieve certain additional programming guide information beyond that of channel grid region 310. In one example, remote control device 100 may retrieve programming guide information in channel grid region 311 that has not already been retrieved (e.g., programming information in channel grid region 311 that is not also included in channel grid region 310). For instance, after retrieving information corresponding to channel grid region 310, remote programming guide module 134 of remote control device 100 may cause communication unit 106 to send a signal requesting programming guide information corresponding to the additional programming guide information in channel grid region 311. Communication unit 152 of television 150 may detect the signal, and may output to service module 184 an indication of the detected signal. Service module 184 may determine, based on the indication of the detected signal, that the signal corresponds to a request for information corresponding to the additional programming guide information in channel grid region 311. Responsive to the indication of the detected signal, service module 184 may cause communication unit 152 to send a signal including the requested programming guide information. Communication unit 106 of remote control device 100 may detect the signal and may output to remote programming guide module 134 an indication of the detected signal. Remote programming guide module 134 may determine, based on the indication of the detected signal, that the signal corresponds to the requested additional programming guide information in channel grid region 311. Remote programming guide module 134 may parse the programming guide information from the indication of the detected signal and store information from channel grid region 311 as programming guide information 138. In some examples, programming guide information 138 may be stored for later use in creating future user interfaces.

In the example previously described, remote control device 100 retrieves programming guide information for channel grid region 310, and then retrieves programming guide information for channel grid region 311. In another example, remote control device 100 may retrieve programming guide information corresponding to channel grid region 310 and may also retrieve some or all of the programming guide information channel grid region 311 at the same time. In such an example, remote programming guide module 134 may, when creating programming guide user interface 200a, parse the programming guide information for channel grid region 310 from the data received, and use that information to create programming guide user interface 200a. Remote programming guide module 134 may store some or all of the remaining programming guide information as programming guide information 138. Other information may also be stored as programming guide information 138.

In FIG. 2B, channel grid region 311 is presented as an example set of related programming guide information that may be used in creating future user interfaces for presentation at remote control device 100. Other example regions are possible, and in other examples, channel grid region 311 may encompass other timeslots and/or other channels.

Figures 3A, 3B:
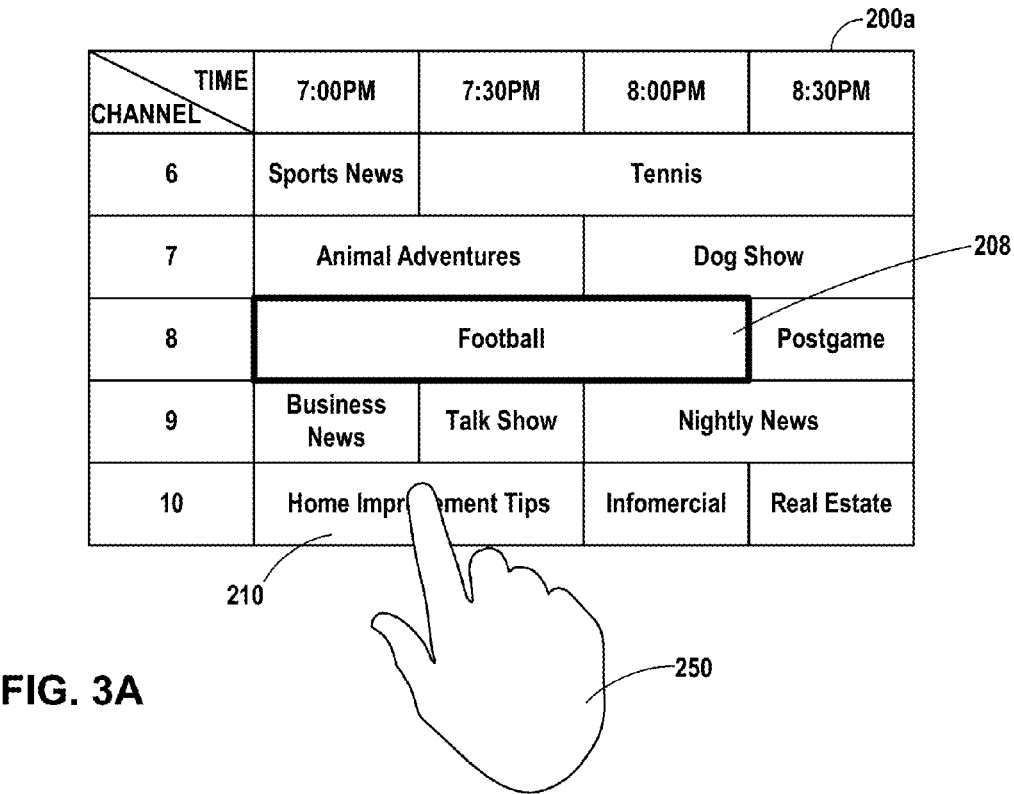
FIG. 3A is a conceptual diagram illustrating an example programming guide user interface for an example remote control device.
FIG. 3B is a conceptual diagram illustrating an example programming guide user interface that has been updated after an example remote control device detects user input in connection with FIG. 3A.
Figure 3C:
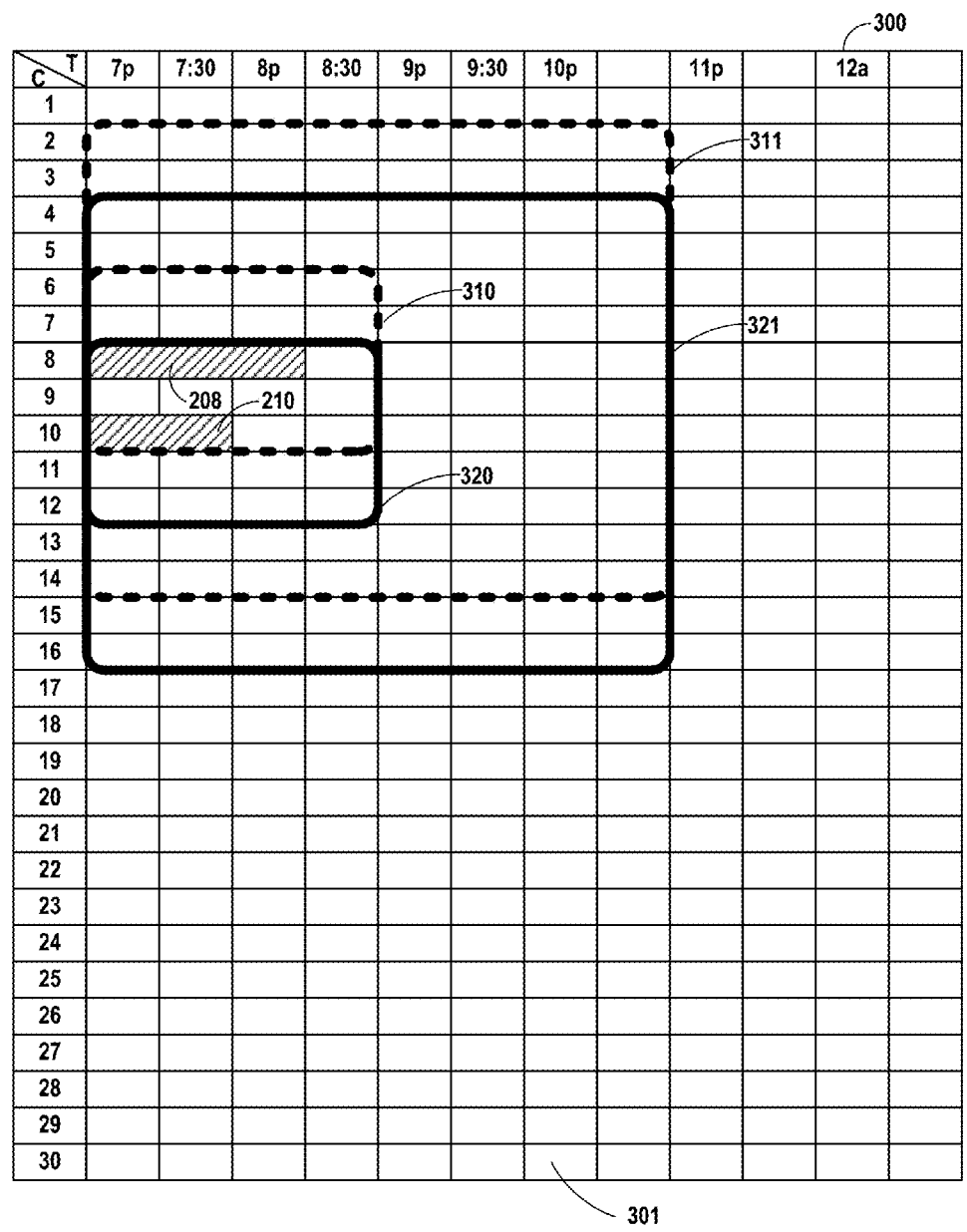
FIG. 3C is a conceptual diagram illustrating an example channel grid for operations described in connection with FIG. 3A and FIG. 3B.

FIG. 3A is a conceptual diagram illustrating an example programming guide user interface 200a for an example remote control device 100. FIG. 3B is a conceptual diagram illustrating an example programming guide user interface 200b that has been updated after an example remote control device 100 detects user input in connection with FIG. 3A. FIG. 3C is a conceptual diagram illustrating an example channel grid 300 for operations described in connection with FIG. 3A and FIG. 3B. FIG. 3A, FIG. 3B, and FIG. 3C illustrate one or more examples and/or one or more example operations in accordance with one or more aspects of the present disclosure. For purposes of illustration, FIG. 3A, FIG. 3B, and FIG. 3C are described below within the context of remote control device 100 and television 150 of FIG. 1.

In the example of FIG. 3A, remote control device 100 may present programming guide user interface 200a at presence-sensitive display 101. In a manner similar to that described in connection with FIG. 2A and FIG. 2B, the information presented by programming guide user interface 200a may correspond to the information represented by channel grid region 310 of FIG. 3C. Programming guide information 138 in storage device 124 may include programming guide information for channel grid region 311.

Presence-sensitive display 101 may detect one or more taps, gestures, and/or other inputs at locations of presence-sensitive display 101 at which remote control device 100 presents program user interface element 210. In response, presence-sensitive display 101 may output to remote user interface module 132 an indication of input detected by presence-sensitive display 101. Remote user interface module 132 may determine, based on the indication of input, information about the input. Remote user interface module 132 may output to remote programming guide module 134 information about the input, and in response, remote programming guide module 134 may determine that the input corresponds to selection of program user interface element 210. (Note hand 250 intended to signify selection of program user interface element 210 in FIG. 2.) Remote programming guide module 134 may interpret selection of program user interface element 210 as a request to tune television 150 to channel 10.

Remote programming guide module 134 may cause communication unit 106 to send a signal indicating a request to tune television 150 to channel 10. Communication unit 152 may detect the signal, and may output to service module 184 an indication of the detected signal. Service module 184 may determine, based on the indication of the detected signal, that the signal corresponds to a request (e.g., by remote control device 100 or by another device) to tune television 150 to channel 10. In response, service module 184 may tune television 150 to channel 10.

In some examples, television 150 may cause communication unit 152 to send a signal identifying the current channel as channel 10, or indicating that television 150 has been tuned to channel 10. Communication unit 106 of remote control device 100 may detect the signal, and may output to remote programming guide module 134 an indication of the detected signal. Remote programming guide module 134 may determine, based on the indication of detected signal, that television 150 is tuned to channel 10. In this example, remote control device 100 may interpret the indication of the detected signal as a confirmation that television 150 has carried out the request by remote control device 100 to tune television 150 to channel 10.

Responsive to television 150 tuning to channel 10, or at the same time, or concurrently, at another time, remote programming guide module 134 may update programming guide user interface 200a. In updating programming guide user interface 200a, remote programming guide module 134 may access information stored in storage device 124 as programming guide information 138. Remote programming guide module 134 may also cause communication unit 106 to send a request for any programming guide information not stored locally as programming guide information 138 that may be needed to update programming guide user interface 200a. In the example of FIG. 3A and FIG. 3B, information from channel grid region 320 may be needed to update programming guide user interface 200a, and since channel grid region 320 is within channel grid region 311, the information from channel grid region 320 may be stored in storage device 124 as programming guide information 138. Remote programming guide module 134 may update programming guide user interface 200a and cause remote user interface module 132 to present programming guide user interface 200b at presence-sensitive display 101 as shown in FIG. 3B.

Further, at the same time that remote programming guide module 134 may be updating programming guide user interface 200a, or concurrently, and/or at a different time, remote programming guide module 134 may store additional programming information in storage device 124 as programming guide information 138. Such additional programming information may include information beyond the information in channel grid region 320, but may be related to the programming guide information shown in programming guide user interface 200b of FIG. 3B. In some examples, such information may include information in channel grid region 321, because channel grid region 321 includes programming guide information adjacent to or near the channels presented in programming guide user interface 200b after remote control device 100 updates programming guide user interface 200a.

For instance, remote programming guide module 134 may cause communication unit 106 to send a signal requesting some or all of the information in channel grid region 321. Communication unit 152 of television 150 may detect the signal, and may output to service module 184 an indication of the detected signal. Service module 184 may determine, based on the indication of the detected signal, that the signal corresponds to a request for information in channel grid region 321. Responsive to the indication of the detected signal, service module 184 may cause communication unit 152 to send a signal including the requested programming guide information. Communication unit 106 of remote control device 100 may detect the signal and may output to remote programming guide module 134 an indication of the detected signal. Remote programming guide module 134 may determine, based on the indication of the detected signal, that the signal corresponds to information in channel grid region 321. Remote programming guide module 134 may parse information from the indication of the detected signal and store information from channel grid region 321 in storage device 124 as programming guide information 138 for later use.

In some examples, information in channel grid region 311 that is not also in channel grid region 321 (e.g., information for channels 2 and 3 in FIG. 3C) may be discarded. In other examples, such information may be retained in storage device 124 as programming guide information 138.

Figure 4A:
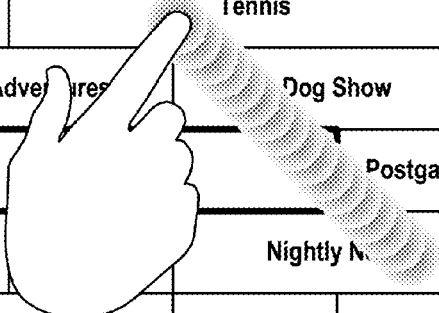
FIG. 4A is a conceptual diagram illustrating an example programming guide user interface for an example remote control device.
Figure 4B:
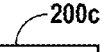
FIG. 4B is a conceptual diagram illustrating an example programming guide user interface that has been updated after an example remote control device detects user input (e.g., a swipe gesture) as illustrated in FIG. 4A.
Figure 4C:
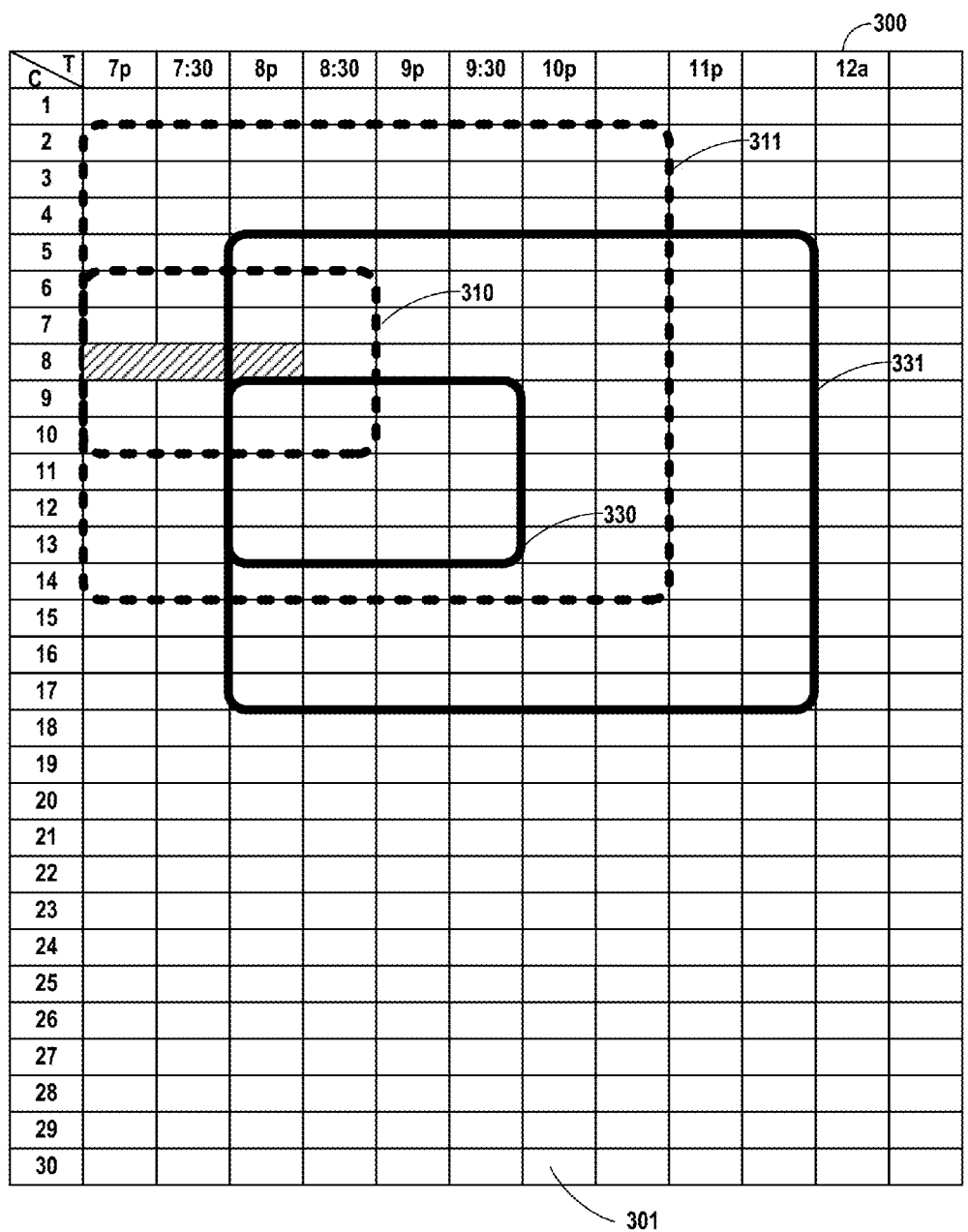
FIG. 4C is a conceptual diagram illustrating an example channel grid for operations described in connection FIG. 4A and FIG. 4B.

FIG. 4A is a conceptual diagram illustrating an example programming guide user interface 200a for an example remote control device 100 detecting a swipe gesture. FIG. 4B is a conceptual diagram illustrating an example programming guide user interface 200c that has been updated after an example remote control device 100 detects user input (e.g., a swipe gesture) as illustrated in FIG. 4A. FIG. 4C is a conceptual diagram illustrating an example channel grid 300 for operations described in connection FIG. 4A and FIG. 4B. FIG. 4A, FIG. 4B, and FIG. 4C illustrate one or more examples and/or one or more example operations in accordance with one or more aspects of the present disclosure. For purposes of illustration, FIG. 4A, FIG. 4B, and FIG. 4C are described below within the context of remote control device 100 and television 150 of FIG. 1.

With reference to FIG. 4A, remote control device 100 may present programming guide user interface 200a at presence-sensitive display 101, and in a manner similar to that described in connection with FIG. 2A and FIG. 2B, the information presented by programming guide user interface 200a may correspond to the information represented by channel grid region 310 of FIG. 4C. Programming guide information 138 in storage device 124 may include programming guide information for channel grid region 311 of FIG. 4C.

Remote control device 100 may detect one or more taps, gestures, and/or other inputs at locations of presence-sensitive display 101 that remote control device 100 determines corresponds to the swipe gesture illustrated in FIG. 4A. In response, remote control device 100 may update programming guide user interface 200a. In one example, in response to the swipe gesture illustrated in FIG. 4A, remote control device 100 may update programming guide user interface 200a and may present at presence-sensitive display 101 the updated programming guide user interface 200c as shown in FIG. 4B. To create programming guide user interface 200c, remote control device 100 may access information in storage device 124 stored as programming guide information 138. In the example in FIG. 4B and FIG. 4C, information needed to update programming guide user interface 200a to programming guide user interface 200c may generally include information in channel grid region 330. As illustrated in FIG. 4C, channel grid region 330 is included within channel grid region 311, so some or all of the information in channel grid region 330 may be stored in storage device 124 as programming guide information 138. If information needed to update programming guide user interface 200a is stored in storage device 124 as programming guide information 138, remote control device 100 may be able to update programming guide user interface 200a and present programming guide user interface 200c at presence-sensitive display 101 quickly, efficiently, and responsively. Remote control device 100 may also retrieve from television 150 any programming guide information not included in programming guide information 138 that may be needed to update programming guide user interface 200a to programming guide user interface 200c.

Remote control device 100 may store additional programming information in storage device 124 as programming guide information 138. Such additional programming information may include information related to one or more programs included in programming guide user interface 200c, and such information may include programming guide information beyond the information corresponding to channel grid region 330 and beyond information corresponding to channel grid region 311. In the example of FIG. 4C, remote control device 100 may store in storage device 124 information corresponding to channel grid region 331 because channel grid region 331 includes programming guide information adjacent to or near the channels and time slots presented in programming guide user interface 200c in FIG. 4B. Accordingly, remote control device 100 may send a signal requesting information corresponding to channel grid region 331. Television 150 may detect the signal, and determine that it corresponds to a request for information in channel grid region 331. Television 150 may send a signal including information for channel grid region 331, and remote control device 100 may detect the signal, parse information for channel grid region 331 from the detected signal, and store such information in storage device 124 as programming guide information 138.

Figure 4D:
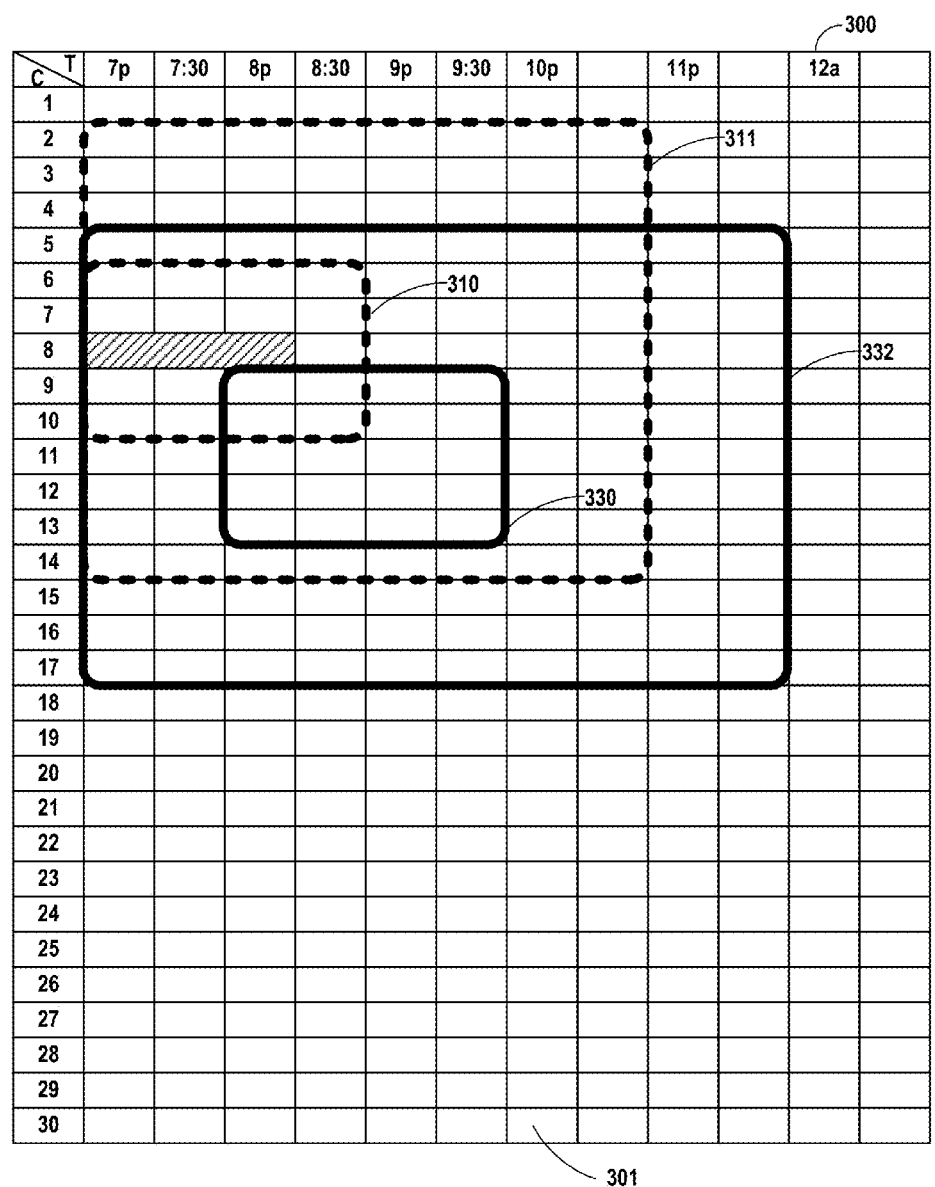
FIG. 4D is a conceptual diagram illustrating channel guide information retrieved by an example remote control device in connection FIG. 4A and FIG. 4B.

FIG. 4D is a conceptual diagram illustrating channel guide information retrieved by an example remote control device 100 in connection FIG. 4A and FIG. 4B. In the example of FIG. 4D, remote control device 100 retrieves and stores information different than that described in connection with FIG. 4C. For example, as illustrated in FIG. 4D, remote control device 100 may store information corresponding to channel grid region 332 when programming guide user interface 200c presents information corresponding to channel grid region 330. Channel grid region 332 differs from channel grid region 331 in that channel grid region 332 includes information for timeslots at 7 pm and 7:30 pm. Information closer to or including the current time may be considered related to programs included in programming guide user interface 200c, and may often be of interest to a person watching or interacting with television 150. Accordingly, it may be advantageous to store such information in storage device 124 as programming guide information 138. If such information is stored in storage device 124 as programming guide information 138, remote control device 100 may be able to access the information quickly when later updating the user interface presented at presence-sensitive display 101.

Figure 4E:
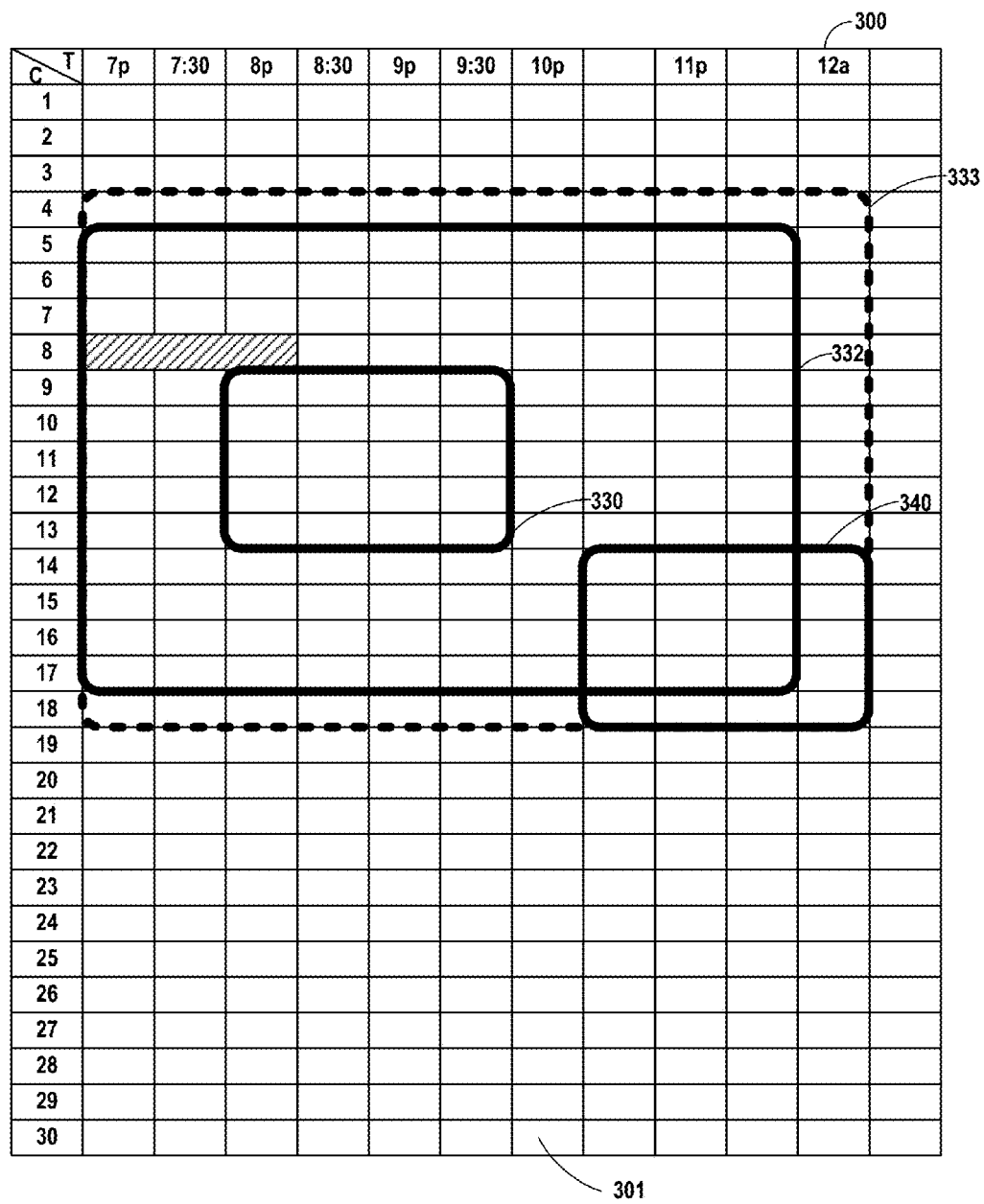
FIG. 4E is a conceptual diagram illustrating channel guide information retrieved by an example remote control device in connection FIG. 4A and FIG. 4B.

FIG. 4E is a conceptual diagram illustrating channel guide information retrieved by an example remote control device 100 in connection FIG. 4A and FIG. 4B. In other examples, remote control device 100 may retrieve and store additional information. For example, as illustrated in FIG. 4E, after remote control device 100 has stored information corresponding to channel grid region 332, remote control device 100 may continue to retrieve additional programming information from television 150, and may store such information in storage device 124 as programming guide information 138.

For instance, FIG. 4E illustrates channel grid region 333, which includes additional programming information beyond channel grid region 332. Remote control device 100 may retrieve and store information corresponding to channel grid region 333 while remote control device 100 is idle, or may retrieve and store information corresponding to channel grid region 333 at other times. As remote control device 100 continues to retrieve additional information including in channel grid region 333 and even beyond channel grid region 333, remote control device 100 may store such information for later use. Remote control device 100 may then be able to access such information more quickly later, such as when creating additional user interfaces in response to detecting input or user interactions with user interfaces. For example, remote control device 100 may detect a forceful swiping gesture, and may update programming guide user interface 200a to include information corresponding to channel grid region 340. If remote control device 100 had previously stored in storage device 124 information corresponding to channel grid region 333, remote control device 100 may be able to update programming guide user interface 200a to create new user interface using information stored in storage device 124 as programming guide information 138. Remote control device 100 may thereby provide a responsive, efficient, and pleasing user experience. If remote control device 100 had not previously stored in storage device 124 information corresponding to channel grid region 333, remote control device 100 may need to request at least some information from television 150, which in at least some examples, may result in a user interface or user experience that is not as responsive.

In some examples, remote control device 100 may cause communication unit 106 to send a signal requesting programming guide information and including data describing a previous request for programming guide information. For example, remote programming guide module 134 may first cause communication unit 106 to send a first signal requesting programming guide information corresponding to channels and time slots represented by channel grid region 310 of FIG. 2B. Service module 184, in response, may send a signal including the programming guide information corresponding to channels and time slots represented by channel grid region 310. Remote programming guide module 134 may parse the programming guide information and create a user interface including at least some of the programming guide information. Remote programming guide module 134 may cause remote user interface module 132 to present the user interface at presence-sensitive display 101.

Remote programming guide module 134 may subsequently cause communication unit 106 to send a second signal requesting programming guide information and including data describing the first signal requesting programming guide information corresponding to channels and time slots represented by channel grid region 310 of FIG. 2B. For example, remote programming guide module 134 may determine to refresh programming guide information based on the passage of time, e.g., when a time slot has expired and programming guide information for the time slot is no longer relevant. Service module 184, in response to the second signal and based on the data describing the previous request for programming guide information, may determine that the programming guide information sent in the previous reply is a sufficient response to the second signal and that no further programming guide information is to be sent in response to the second signal. Returning to the above example, service module 184, in response to the second signal, may determine that the programming guide information corresponding to channels and time slots represented by channel grid region 310 is sufficient for remote control device 100. Based on the second signal including data describing the previous request for programming guide information and the determination the previously-sent programming guide information is sufficient for remote control device 100, service module 184 may send a signal that indicates that previously-sent programming guide information is sufficient, in response to the second signal. Remote programming guide module 134 may receive the signal that indicates that previously-sent programming guide information is sufficient and in this way avoid parsing new programming guide information and creating a new user interface.

Contrariwise, service module 184, in response to the second signal requesting programming guide information and including data describing the first signal requesting programming guide information, may determine that the previously-sent programming guide information is not sufficient for remote control device 100. Service module 184 may determine new programming guide information responsive to the request and send a signal that includes the new programming guide information. Remote programming guide module 134 may parse the new programming guide information and create a new user interface including at least some of the new programming guide information. Remote programming guide module 134 may cause remote user interface module 132 to present the new user interface at presence-sensitive display 101.

Figure 5A:
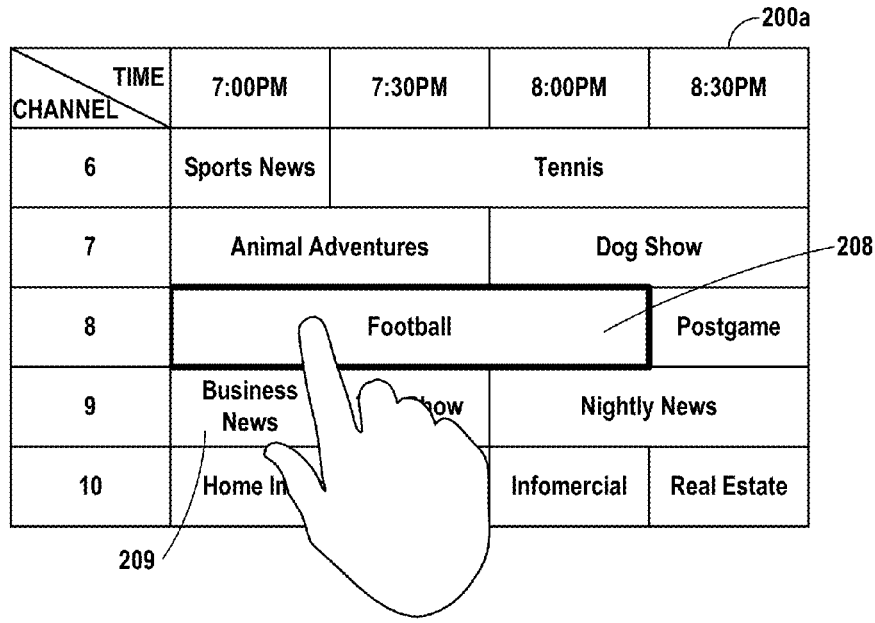
FIG. 5A is a conceptual diagram illustrating an example programming guide user interface for an example remote control device detecting input corresponding to a request for details about a program.

FIG. 5A is a conceptual diagram illustrating an example programming guide user interface 200a for an example remote control device 100 detecting input corresponding to a request for details about a program. In the example shown in FIG. 5A, programming guide information for channels 6 through 10 may be presented in programming guide user interface 200a while television 150 may be tuned to channel 8.

Figure 5B:
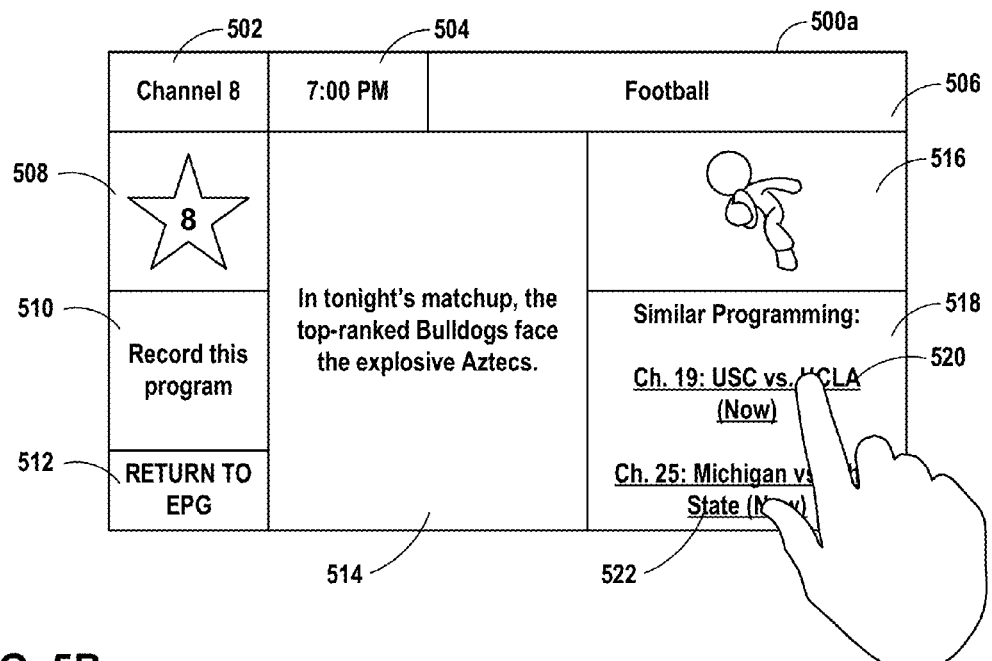
FIG. 5B is a conceptual diagram illustrating an example program details user interface.

FIG. 5B is a conceptual diagram illustrating an example program details user interface 500a. Program details user interface 500a in FIG. 5B shows details for the program corresponding to currently selected program 208. Program details user interface 500a includes a number of user interface elements, including program channel 502, program time 504, program title 506, channel graphics 508, record button 510, guide button 512, program details summary 514, program graphics region 516, and related programs region 518.

Channel graphics 508 may include a graphic or logo corresponding to the channel on which the program corresponding to currently selected program 208 is being send. In some examples, remote control device 100 may detect input that it determines corresponds to selection of channel graphics 508, and in response, remote control device 100 may present information about channel 8. In some examples, the channel 8 may be added to a favorite channels list. In some examples, channel 8 may be added to a recommended channel list, which may be shared with other viewers of television 150 or may be associated with a social network or other networked community.

Record button 510 is a user interface element for recording the current program. For instance, remote control device 100 may detect input that it determines corresponds to selection of record button 510, and in response, remote control device 100 may cause remote control device 100 and/or television 150 to record in recorded program information 189 some or all of the program corresponding to currently selected program 208. In some examples, the program corresponding to currently selected program 208 may be added to a list of programs for which all episodes are recorded. In some examples, the program corresponding to currently selected program 208 may be added to a favorite programs list. In some examples, the program corresponding to currently selected program 208 may be added to a recommended programs list, which may be shared with other viewers of television 150 or may be associated with a social network or other networked community.

Guide button 512 is a user interface element for returning to guide information (e.g., programming guide user interface 200a). Remote control device 100 may detect input that it determines corresponds to selection of guide button 512, and in response, remote control device 100 may present programming guide user interface 200a at presence-sensitive display 101.

Program details summary 514 may present at presence-sensitive display 101 details, a summary, or a synopsis of the program corresponding to currently selected program 208. Program graphics region 516 may present graphics, a video clip, or a live stream for the program corresponding to currently selected program 208.

Related programs region 518 may include a list of programs identified as similar programming. These programs are identified by the programming guide information as having subject matter or topics that are similar to the program corresponding to currently selected program 208. For instance, if currently selected program 208 is a broadcast of a football game, related programs region 518 may include a listing of other football games currently being broadcast and/or football games available at a later time. Related programs region 518 and/or other regions of program details user interface 500a may include one or more active user interface elements, including related program user interface element 520 and related program user interface element 522. Related program user interface element 520 and/or related program user interface element 522 may be links that, when invoked by user input, cause remote control device 100 to perform an operation.

Some or all of the information included in program details user interface 500a may be part of the information transmitted by television 150 in response to requests for programming information. Accordingly, when information for creating programming guide user interface 200a is retrieved by remote control device 100 from television 150, some or all of the details information of the type shown in program details user interface 500a may be included, and such information may be stored in storage device 124 as programming guide information 138. Information corresponding to some or all of channel grid time slots 301 may, in some examples, be considered to include details information of the type shown in program details user interface 500a.

In other examples, details information of the type shown in FIG. 500a might not be part of the information sent by television 150 in response to requests for programming information. In some examples, remote control device 100 might perform a separate request for such details information, and/or retrieve such information separately. In other examples, remote control device 100 might perform a specific request for such details information. Information corresponding to some or all of channel grid time slots 301 might, in some examples, not be considered to include details information of the type shown in program details user interface 500a. In some examples, details information of the type shown in program details user interface 500a might be considered related programming information.

Referring again to FIG. 5A, remote control device 100 may present programming guide user interface 200a at presence-sensitive display 101. Remote control device 100 may detect one or more taps, gestures, and/or other inputs at locations of presence-sensitive display 101 that it determines corresponds to an interaction with currently selected program 208, which may the channel currently being presented by television 150. In some examples, input detected by remote control device 100 may correspond to a long-press operation, which may be interpreted differently than the selection operation described in connection with FIG. 3A. In response to the input, remote control device 100 may update programming guide user interface 200a and present at presence-sensitive display 101 the updated program details user interface 500a as shown in FIG. 5B.

Figures 5C, 5D:
FIG. 5C is a conceptual diagram illustrating an example after an example remote control device detects input in FIG. 5B.
FIG. 5D is a conceptual diagram illustrating an example program details user interface after remote control device detects input in FIG. 5B.

FIG. 5C is a conceptual diagram illustrating an example 200d after an example remote control device 100 detects input in FIG. 5B. Referring to FIG. 5B, remote control device 100 may detect input that it determines corresponds to selection of related program user interface element 520. In response, remote control device 100 may send a signal that represents a request to tune television 150 to channel 19, which is the channel on which the program corresponding to related program user interface element 520 is being broadcast. Television 150 may detect the signal, and in response, tune to channel 19. Television 150 may send a signal identifying the current channel as channel 19. Remote control device 100 may detect the signal, and present programming guide user interface 200*d* at presence-sensitive display 101, as shown in FIG. 5C.

FIG. 5D is a conceptual diagram illustrating an example program details user interface 500*d* after remote control device 100 detects input in FIG. 5B. Referring again to FIG. 5B, in an alternate example, remote control device 100 may detect input that it determines corresponds to selection of related program user interface element 520. In response, remote control device 100 may present program details user interface 500*b* at presence-sensitive display 101, as shown in FIG. 5D. In this example, rather than cause television 150 to tune to channel 19, remote control device 100 presents program details user interface 500*b*, which includes details information for channel 19. Remote control device 100 may thereafter detect input that it determines corresponds to selection of button 524, and in response, remote control device 100 may send a signal causing television 150 to tune to channel 19.

Figure 5E:
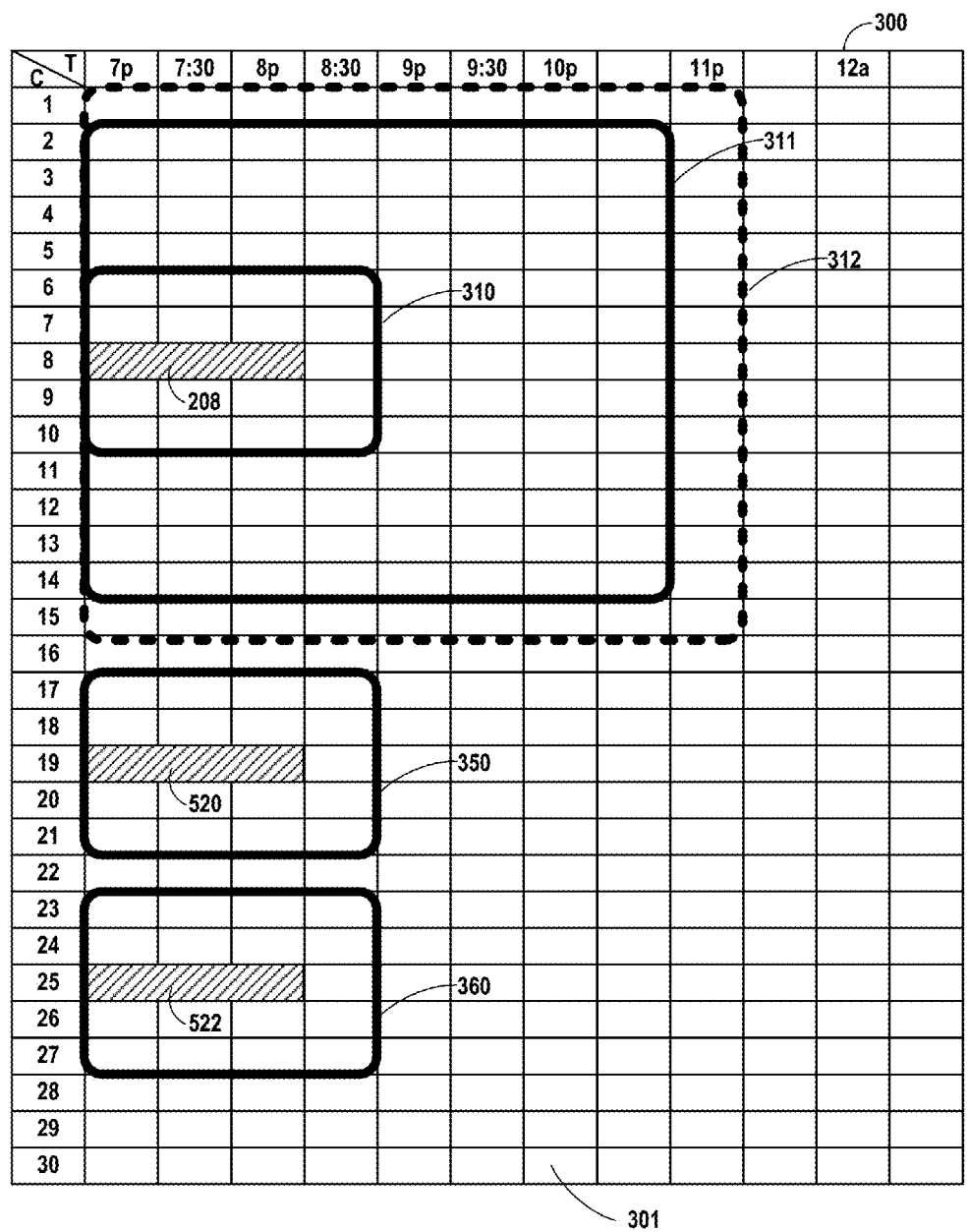
FIG. 5E is a conceptual diagram illustrating channel guide information retrieved by an example remote control device in connection with FIG. 5A, FIG. 5B, and FIG. 5C.

FIG. 5E is a conceptual diagram illustrating channel guide information retrieved by an example remote control device 100 in connection with FIG. 5A, FIG. 5B, and FIG. 5C. Referring again to FIG. 5B and FIG. 5C, remote control device 100 may detect selection of related program user interface element 520 in FIG. 5B, and in response, remote control device 100 may, in some examples, cause television 150 to tune to channel 19 and present programming guide user interface 200*d* as shown in FIG. 5C. Similarly, remote control device 100 may detect selection of related program user interface element 522 in FIG. 5B, and in response, remote control device 100 may, in some examples, cause television 150 to tune to channel 25 and present a user interface including programming guide information for channels 23 through 27. Accordingly, remote control device 100 may, in some examples, advantageously retrieve and store information corresponding to channel grid region 350 and/or channel grid region 360 of FIG. 5E when remote control device 100 presents program details user interface 500*a* in FIG. 5B. If information corresponding to channel grid region 350 is stored in storage device 124 as programming guide information 138, remote control device 100 may be able to quickly create programming guide user interface 200*d* upon remote control device 100 detecting selection of related program user interface element 520. Similarly, if information corresponding to channel grid region 360 is stored in storage device 124 as programming guide information 138, remote control device 100 may be able to quickly create a corresponding user interface upon detecting selection of related program user interface element 522.

In the example described in connection with FIG. 5E, the program corresponding to related program user interface element 520 may be considered related to the program corresponding to currently selected program 208 because the programs have similar subject matter (e.g., both are football games). The remaining programming information in channel grid region 350 may also be considered to be related to the program corresponding to currently selected program 208 because channel grid region 350 includes program information for channels and times near the program corresponding to related program user interface element 520. Similarly, the program corresponding to related program user interface element 522 may be considered related to the program corresponding to currently selected program 208 to the extent that the programs have similar subject matter (e.g., both are football games). The remaining programming information in channel grid region 360 is also considered to be related to the program corresponding to currently selected program 208 because channel grid region 360 includes program information for channels and times near the program corresponding to related program user interface element 522.

Figure 6A:
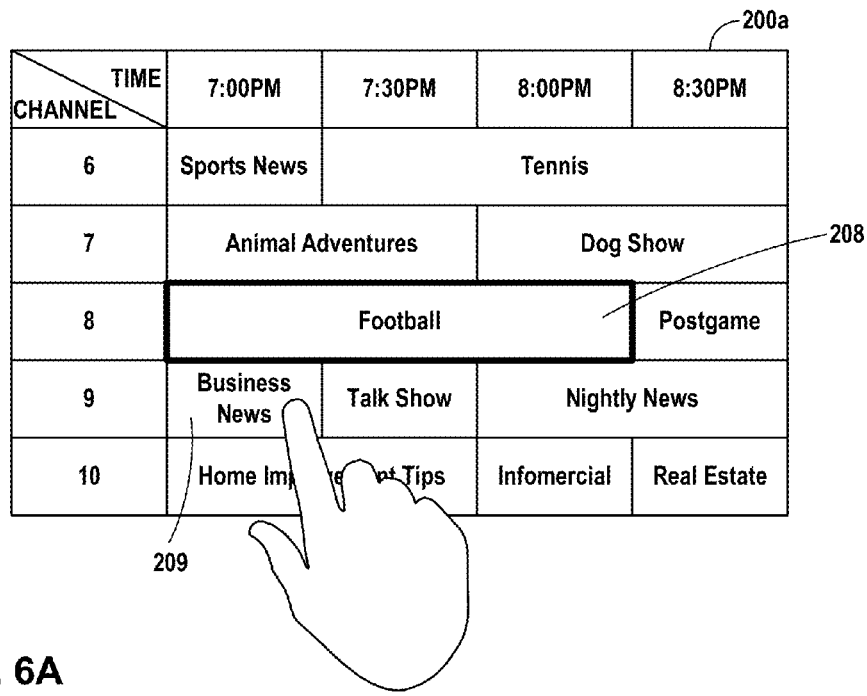
FIG. 6A and FIG. 6B are conceptual diagrams illustrating how an example remote control device may respond to a request for details about a program.
Figure 6B:
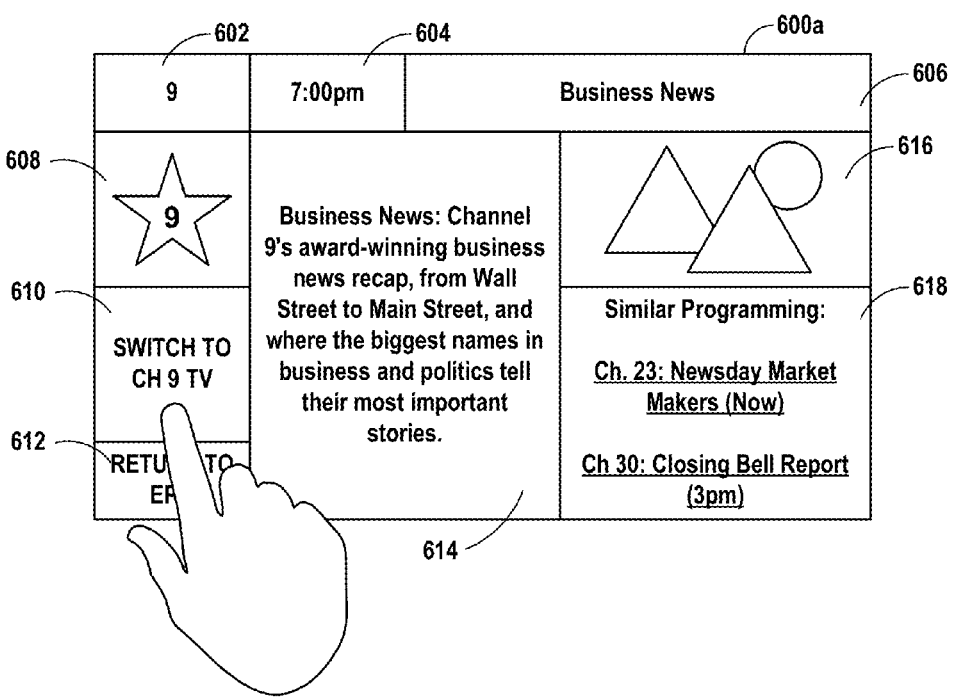

FIG. 6A and FIG. 6B are conceptual diagrams illustrating how an example remote control device 100 may respond to a request for details about a program. In the example programming guide user interface 200*a* shown in FIG. 6A, programming guide information for channels 6 through 10 may be presented in programming guide user interface 200*a* while television 150 may be tuned to channel 8. Program details user interface 600*a* in FIG. 6B shows details for the program corresponding to program user interface element 209. Program details user interface 600*a* includes a number of user interface elements similar to that of FIG. 6B, including button 610, program graphics region 616, and related programs region 618. Program graphics region 616 may present graphics, video clip(s), and/or a live stream for the program corresponding to program user interface element 209. Related programs region 618 may present a list of programs having similar subject matter or topics that are similar to the program corresponding to program user interface element 209. Related programs region 618 may include links to such programs, and may include active user interface elements.

With reference to FIG. 6A, remote control device 100 may detect input that it determines corresponds to a selection of program user interface element 209 requesting details for the program corresponding to program user interface element 209. In some examples, remote control device 100 may detect a long-press gesture or operation, which may be interpreted differently by remote control device 100 than a selection gesture. In some examples, a long-press gesture may be interpreted by remote control device 100 as a request for details information, whereas a selection or tap gesture may be interpreted by remote control device 100 as a request to change the channel being presented by television 150. In response to the detected long-press input, remote control device 100 may present program details user interface 600*a* at presence-sensitive display 101 as shown in FIG. 6B. Television 150 may continue to present content from channel 8.

In FIG. 6B, remote control device 100 may detect input that it determines corresponds to selection of button 610. In response, remote control device 100 may cause television 150 to tune to channel 9. In response to causing television 150 to tune to channel 9, remote control device 100 may create a new user interface, such as one displaying programming guide information for channels 7 through 12, and present it at presence-sensitive display 101.

Figure 7A:
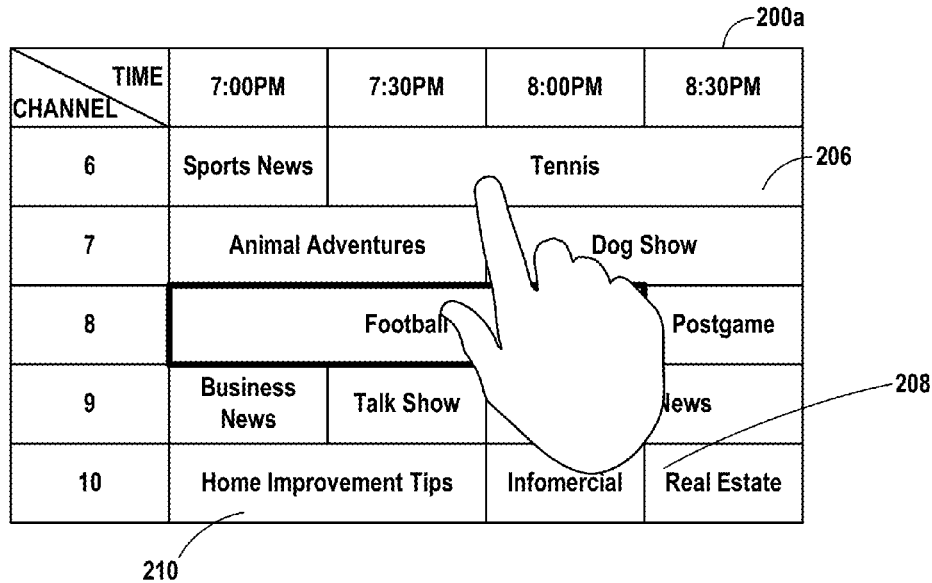
FIG. 7A and FIG. 7B are conceptual diagrams providing another illustration of how an example remote control device may respond to a request for request for details about a program.
Figure 7B:
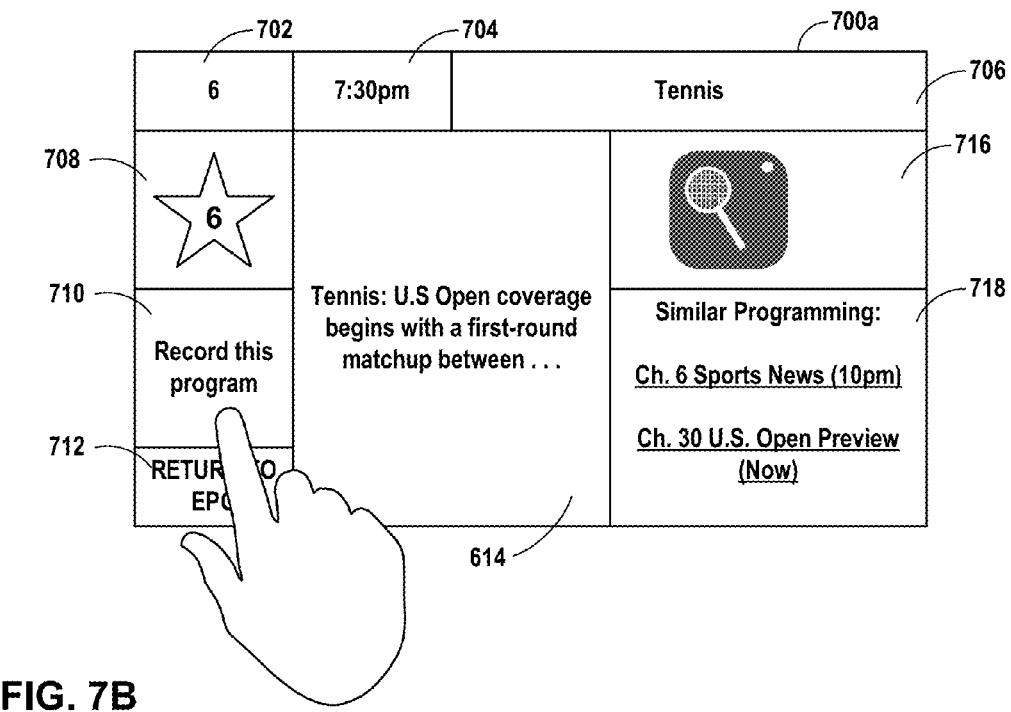

FIG. 7A and FIG. 7B are conceptual diagrams providing another illustration of how an example remote control device 100 may respond to a request for request for details about a program. In the example shown in FIG. 7A, programming guide information for channels 6 through 10 is presented in programming guide user interface 200*a* while television 150 may be tuned to channel 8. Program details user interface 700*a* in FIG. 7B shows details for the program corresponding to program user interface element 206. Program details user interface 700*a* includes button 710, program graphics region 716, and related programs region 718. Program graphics region 716 may present graphics, video clip(s), trailer(s) and/or other information for the program corresponding to program user interface element 206. In some examples, because program user interface element 206 corresponds to a future program to be aired, a live stream might not be available. Related programs region 718 may present a list of programs having subject matter or topics that are similar to the program corresponding to program user interface element 206.

With reference to FIG. 7A, remote control device 100 may detect input that it determines corresponds to selection of program user interface element 206. In response to the detected input, remote control device 100 may present program details user interface 700a at presence-sensitive display 101 as shown in FIG. 7B. Program details user interface 700a presents details of the program corresponding to program user interface element 206. In the example of FIG. 7B, since program user interface element 206 corresponds to a program yet to be aired, remote control device 100 may respond to either a selection gesture or a long-press gesture by presenting program details user interface 700a. In other examples, remote control device 100 may respond to some inputs by recording the program corresponding to user interface element 206.

In FIG. 7B, remote control device 100 may detect input that it determines corresponds to selection of button 710. In response, remote control device 100 may send a signal indicating a request to schedule a recording of the program corresponding to program user interface element 206. Television 150 may detect the signal, and service module 184 may schedule a recording. At an appropriate time, service module 184 may record channel 6 to capture the contents of the program corresponding to program user interface element 206, and may store information corresponding to that program in storage device 174 as recorded program information 189. Television 150 may thereafter respond to requests for the recorded program by accessing recorded program information 189 and presenting the recorded program at television display 154.

In other examples, remote control device 100 may detect input that it determines corresponds to selection of button 710, and in response, remote control device 100 may schedule a recording of the program. At the appropriate time, remote control device 100 may access video information or a stream of video information from television 150, and may record the information in storage device 124. Remote control device 100 may thereafter be able to respond to requests for the recorded program by accessing information in storage device 124. Remote control device 100 may present the recorded program at presence-sensitive display 101.

Figure 8:
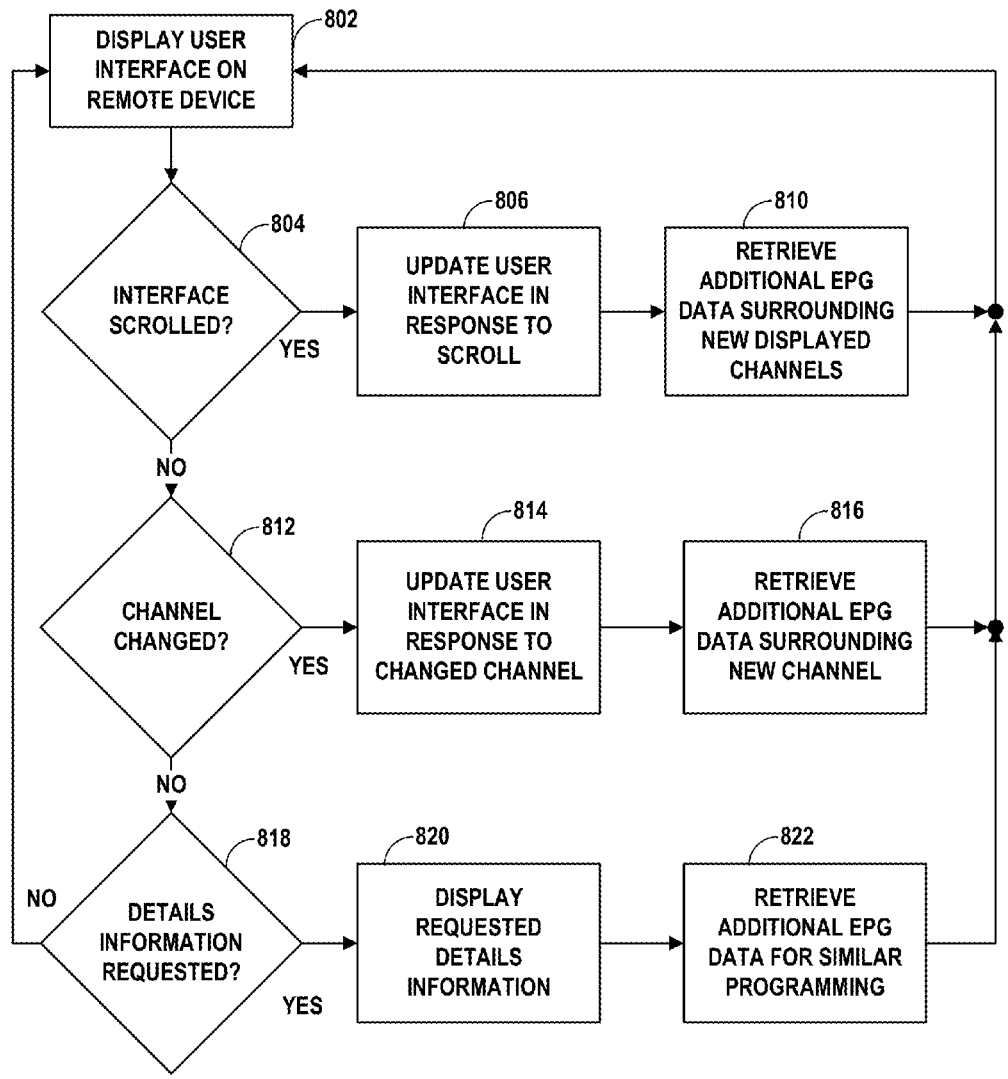
FIG. 8 is a flow diagram illustrating example operations of an example remote control device that presents programming guide information in accordance with one or more aspects of the present disclosure.

FIG. 8 is a flow diagram illustrating example operations of an example remote control device 100 that presents programming guide information in accordance with one or more aspects of the present disclosure. For purposes of illustration, FIG. 8 is described within the context of remote control device 100 of FIG. 1.

In the example of FIG. 8, remote control device 100 may present a user interface including programming guide information (802). Remote control device 100 may detect input that it determines corresponds to a swipe gesture (YES path from 804). Remote control device 100 may respond to such input by scrolling the programming guide information presented at remote control device 100, and presenting an updated user interface (806). In some examples, such an operation does not change the channel or disrupt the content presented by television 150 at television display 154. Remote control device 100 may access programming information needed for the updated user interface by retrieving it from television 150. Remote control device 100 may also retrieve, for later use, related programming guide information. Such related programming guide information may include programming guide information for channels near those presented at remote control device 100 after the scrolling operation, and/or for times near those presented at remote control device 100 after the scrolling operation (810).

Remote control device 100 may alternatively detect input that it determines corresponds to a request to change the channel on television 150 (YES path from 812). Remote control device 100 may present an updated user interface indicating the new channel being presented by television 150 at television display 154 (814). Remote control device 100 may access programming guide information needed for the updated user interface by accessing it locally, but if such information is not stored locally, remote control device 100 may retrieve such information from television 150. Remote control device 100 may also retrieve, for later use, related programming guide information. Such related programming guide information may include programming guide information for channels near those presented at remote control device 100 after the changed channel, and/or for times near those presented at remote control device 100 after the changed channel (816).

Remote control device 100 may alternatively detect input that it determines corresponds to a request for details information about a particular program (YES path from 818). Remote control device 100 may present an updated user interface including the details information (820). Remote control device 100 may access programming guide information needed for the updated user interface by accessing it locally, but if such information is not stored locally, remote control device 100 may retrieve such information from television 150. Remote control device 100 may also retrieve, for later use, related programming guide information. Such related programming guide information may include programming guide information for programs that are similar to one or more programs for which details information is presented at remote control device 100 after the request for details information. Such related programming guide information may also include programming guide information for channels and/or times near any such similar programs (822).

Figure 9:
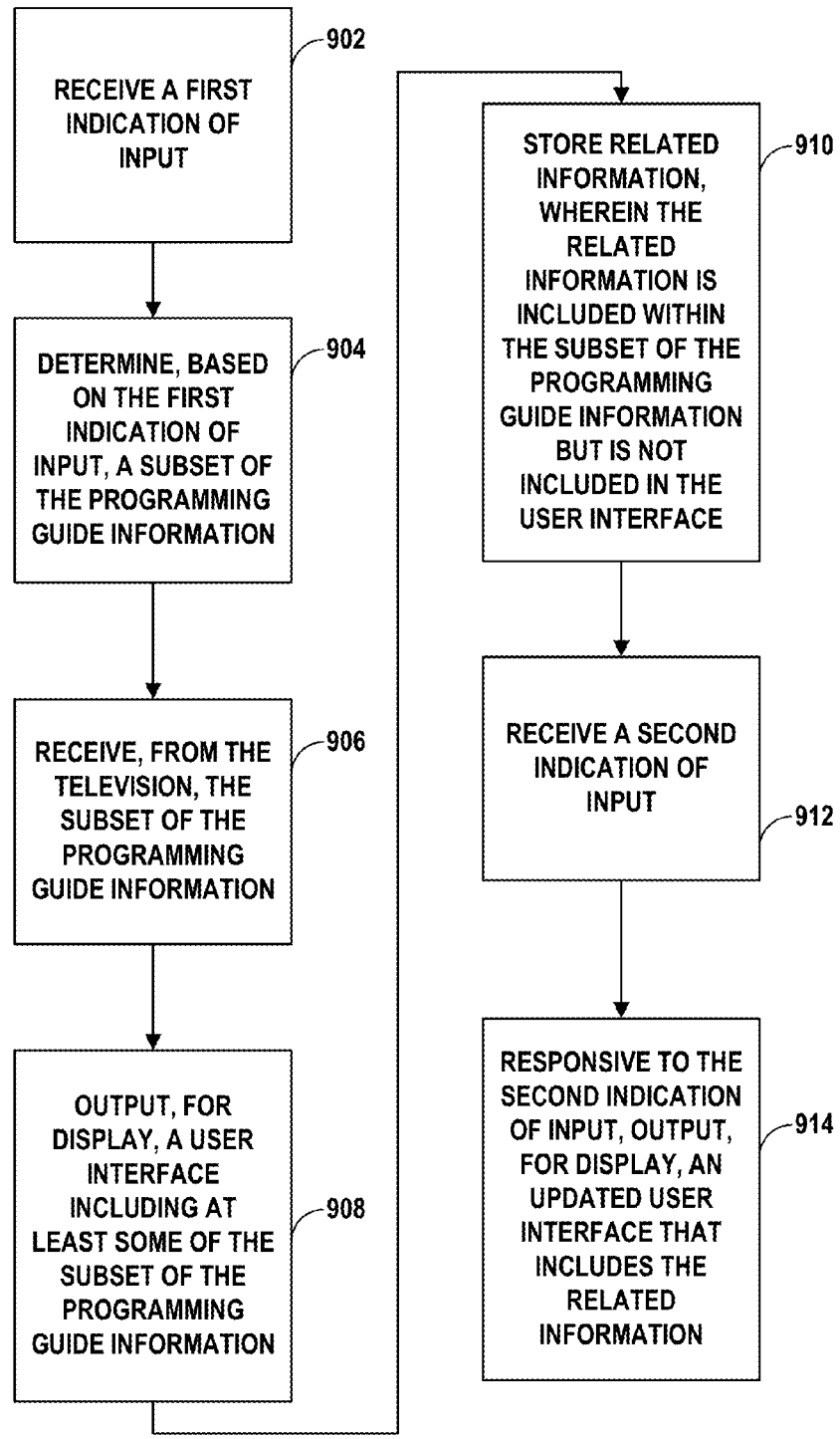
FIG. 9 is a flow diagram illustrating example operations of an example remote control device that is configured to present programming guide information, in accordance with one or more aspects of the present disclosure.

FIG. 9 is a flow diagram illustrating example operations of an example system including an example remote control device 100 that is configured to present programming guide information, in accordance with one or more aspects of the present disclosure. The operations of FIG. 9 may be performed by one or more processors of remote control device 100 or television 150 of FIG. 1. For purposes of illustration, FIG. 9 is described below within the context of FIG. 1 and FIG. 2.

In operation, remote control device 100 may receive a first indication of input (902). For example, remote control device 100 may detect input corresponding to selection of channel 8. Remote control device 100 may determine, based on the first indication of input, a subset of the programming guide information (904). For example, remote control device 100 may determine one or more programs that are near channel 8 or are related to a program broadcast on channel 8. In another example, television 150 may determine, based on the first indication of input, the subset of the programming guide information (904). For example, television 150 may determine one or more programs that are near channel 8 or are related to a program broadcast on channel 8. As used herein, a "subset" may refer to a strict subset. For example, a subset of programming guide information may include less than all of the programming guide information.

Remote control device 100 may receive, from the television, the subset of the programming guide information (906). For example, remote control device may receive programming guide information for channels 4 through 12.

Remote control device 100 may output, for display, a user interface including at least some of the subset of the programming guide information (908). For example, remote control device 100 may cause presence-sensitive display 101 to present a graphical user interface such as that illustrated in FIG. 2, which may include programming guide information for channels 6 through 10.

Remote control device 100 may store related information, wherein the related information is included within the subset of the programming guide information but is not included in the user interface (910). For example, remote control device 100 may store programming guide information for channels 11 and 12 in storage device 124.

Remote control device 100 may receive a second indication of input (912). For example, remote control device 100 may detect input at one or more locations of presence-sensitive display 101, which it may determine corresponds to a swiping gesture.

Remote control device 100 may, responsive to the second indication of input, output, for display, an updated user interface that includes the related information (914). For example, remote control device 100 may cause remote user interface module 132 to present an updated user interface at presence-sensitive display 101 that includes programming guide information for channels 11 and 12.

In accordance with one or more aspects of this disclosure, one or more computing devices may analyze information associated with a user of the same or another computing device. It may be appropriate for such a computing device to analyze such information only after receiving permission from the user. For example, in some examples described in this specification, before a computing device can collect or make use of information associated with a user, the user may be provided with an opportunity to control whether the computing device can collect or make use of information about the user (e.g., information about the input detected by a computing device, such as audio, images, or geolocation information detected by the computing device), or to dictate whether and/or how the computing device can use such information. In some examples, certain data may be modified so that personally-identifiable information is removed. In other examples, a user's geographic location may be generalized where location information is obtained (such as to a city, ZIP code, or state level), so that a particular location of a user cannot be determined.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method comprising:
   receiving, by a remote control device from a television, a first subset of programming guide information;
   outputting, by the remote control device for display, a first user interface including at least some of the first subset of the programming guide information;
   determining, based on the first subset of programming guide information, a second subset of the programming guide information, wherein each program in the second subset of the programming guide information is related by subject to one or more programs within the first subset of programming guide information;

receiving, based on determining the second subset, by the remote control device from the television, the second subset of the programming guide information;

receiving, by the remote control device after outputting the first user interface, an indication of input; and responsive to the indication of input, outputting, by the remote control device for display, a second user interface including at least some of the second subset of the programming guide information.

2. The method of claim 1 further comprising:

storing, by the remote control device, related information that is related to a program included in the first subset of programming guide information by at least one of: channel or time.

3. The method of claim 1, wherein outputting the second user interface comprises:

updating the first user interface to generate the second user interface without requiring further programming guide information from the television.

4. The method of claim 1, wherein determining the second subset of the programming guide information includes determining, by the television, the second subset of the programming guide information.

5. The method of claim 1, wherein determining the second subset of the programming guide information includes determining, by the remote control device, the second subset of the programming guide information.

6. The method of claim 1, further comprising:

outputting, by the remote control device, a request for a third subset of the programming guide information;

receiving, by the remote control device from the television, a response to the request for the third subset of the programming guide information, the response including data comprising the third subset of the programming guide information;

outputting, by the remote control device, a subsequent request for at least some of the programming guide information, the subsequent request comprising data describing the request for the third subset of the programming guide information; and receiving, by the remote control device from the television in response to the subsequent request, an indication that the data comprising the third subset of the programming guide information satisfies the subsequent request.

7. A remote control device comprising:

a display;

at least one processor; and a storage device that stores instructions that when executed cause the at least one processor to:

receive, from a television, a first subset of programming guide information;

output, for display, a first user interface including at least some of the first subset of the programming guide information;

determine, based on the first subset of programming guide information, a second subset of the programming guide information, wherein each program in the second subset of the programming guide information is related by subject to one or more programs within the first subset of programming guide information;

receive, from the television, based on determining the second subset, the second subset of the programming guide information;

receive, after outputting the first user interface, an indication of input; and responsive to the indication of input, output, for display, a second user interface including at least some of the second subset of the programming guide information.

8. The remote control device of claim 7, wherein the instructions, when executed, further cause the at least one processor to:

output a request for a third subset of the programming guide information;

receive, from the television, a response to the request for the third subset of the programming guide information, the response including data comprising the third subset of the programming guide information;

output a subsequent request for at least some of the programming guide information, the subsequent request comprising data describing the request for the third subset of the programming guide information; and receive, from the television in response to the subsequent request, an indication that the data comprising the third subset of the programming guide information satisfies the subsequent request.

9. The remote control device of claim 7, wherein the instructions, when executed, further cause the at least one processor to:

store related information, wherein the related information is related to a program included in the first subset of programming guide information by at least one of: channel or time.

10. The remote control device of claim 7, wherein outputting the second user interface comprises:

updating the first user interface to generate the second user interface without requiring further programming guide information from the television.

11. The remote control device of claim 7, wherein the instructions, when executed, further cause the at least one processor to:

store the second subset of programming guide information; and after outputting the second user interface, removing from storage at least some of the stored second subset of programming guide information.

12. A system comprising:

a television comprising a storage device on which programming guide information is stored; and a remote control device capable of communicating with the television, wherein the remote control device includes at least one processor programmed to:

receive, from the television, a first subset of the programming guide information;

output, for display, a first user interface including at least some of the first subset of the programming guide information;

determine, based on the first subset of programming guide information, a second subset of the programming guide information, wherein each program in the second subset of the programming guide information is related by subject to one or more programs within the first subset of programming guide information, receive, from the television, based on determining the second subset, the second subset of the programming guide information, receive, after outputting the first user interface, an indication of input, and responsive to the indication of input, output, for display, a second user interface including at least some of the second subset of the programming guide information.

13. The system of claim 12, wherein the at least one processor is further programmed to:

store related information, wherein the related information is related to a program included in the first subset of programming guide information by at least one of: channel or time.

14. The system of claim 12, wherein outputting the third user interface comprises:

updating the first user interface to generate the second user interface without requiring further programming guide information from the television.

15. The system of claim 12, wherein the at least one processor is further programmed to:

store the second subset of programming guide information; and after outputting the second user interface, removing from storage at least some of the stored second subset of programming guide information.

16. A television comprising:

a display;

at least one processor; and one or more storage devices on which programming guide information and instructions are stored, wherein the instructions, when executed, cause the at least one processor to:

send, to a remote control device, a first subset of the programming guide information;

determine, based on the first subset of programming guide information, a second subset of the programming guide information, wherein each program in the second subset of the programming guide information is related by subject to one or more programs within the first subset of programming guide information; and send, to the remote control device and based on determining the second subset, for display, the second subset of the programming guide information.

17. The television of claim 16, wherein sending the second subset of the programming guide information includes:

sending, to the remote control device, for storage, further information that is related to a program included in the first subset of the programming guide information, and wherein the further information is related to the program by at least one of: channel, or time.

* * * * *